(12) United States Patent
Garnot et al.

(10) Patent No.: US 7,224,895 B2
(45) Date of Patent: May 29, 2007

(54) METHOD OF MANAGING THE TRAFFIC PROTECTION IN OMS-SPRING NETWORKS

(75) Inventors: Mathieu Garnot, Villiers-le-Bacle (FR); Giuseppa Licata, Segrate (IT); Andrea Mazzini, Pessano con Bornago (IT); Vincenzo Sestito, Milan (IT)

(73) Assignee: Alcatel, Paris (FR)

( * ) Notice: Subject to any disclaimer, the term of this patent is extended or adjusted under 35 U.S.C. 154(b) by 534 days.

(21) Appl. No.: 10/146,812

(22) Filed: May 17, 2002

(65) Prior Publication Data

US 2002/0181039 A1 Dec. 5, 2002

(30) Foreign Application Priority Data

May 30, 2001 (IT) .............................. MI2001A1139

(51) Int. Cl.
  *H04J 14/00* (2006.01)
  *H04B 10/00* (2006.01)
  *H01S 3/00* (2006.01)
(52) U.S. Cl. ................................. 398/3; 398/4; 398/5
(58) Field of Classification Search .................... 398/1, 398/2, 3–5, 6, 7, 59, 83, 69; 385/24; 370/223, 370/244, 216
See application file for complete search history.

(56) References Cited

U.S. PATENT DOCUMENTS

| 5,469,428 | A | * | 11/1995 | Tokura et al. .............. 370/224 |
|---|---|---|---|---|
| 5,537,939 | A | * | 7/1996 | Horton ................... 112/475.19 |
| 5,647,035 | A | * | 7/1997 | Cadeddu et al. .............. 385/24 |
| 5,745,476 | A | * | 4/1998 | Chaudhuri ................... 370/222 |
| 5,815,490 | A | * | 9/1998 | Lu .............................. 370/223 |
| 6,567,194 | B1 | * | 5/2003 | Badr ............................. 398/1 |
| 6,657,952 | B1 | * | 12/2003 | Shiragaki et al. ........... 370/223 |
| 6,728,205 | B1 | * | 4/2004 | Finn et al. .................. 370/217 |
| 6,775,477 | B2 | * | 8/2004 | Badr ............................. 398/1 |
| 6,795,394 | B1 | * | 9/2004 | Swinkels et al. ........... 370/222 |
| 6,798,747 | B1 | * | 9/2004 | Watkins et al. ............. 370/238 |
| 2002/0003639 | A1 | * | 1/2002 | Arecco et al. .............. 359/119 |

OTHER PUBLICATIONS

Ornan Gerstel et al., "Fault tolerant Multiwavelength optical rings with limited wavelength conversion", Sep. 1998, IEEE J. on Selected Areas in Communications, vol. 16, pp. 1166-1178.*

* cited by examiner

*Primary Examiner*—M. R. Sedighian
(74) *Attorney, Agent, or Firm*—Sughrue Mion, PLLC

(57) ABSTRACT

Described is a method for managing the traffic protection in OMS-SPRING networks and allowing the wavelength allocation change in the traffic transit nodes. The method of managing the traffic protection in an OMS-SPRING network should a span of the path fail is characterized in that it comprises the steps of providing a wavelength interchange mechanism; performing a ring Span Switch action by the OMS-SP mechanism; and re-routing the wavelength interchanged path on the protecting wavelength corresponding to the working wavelength of the span affected by a failure.

14 Claims, 22 Drawing Sheets

| DATA FLOW NR. | 1st NODE ⇔ Node ID ||||| ... | 16th NODE ⇔ Node ID |||||
|---|---|---|---|---|---|---|---|---|---|---|---|
| | W | λ | CI | E | λ | CI | W | λ | CI | E | λ | CI |
| 1 W to E ⇧ | | | | | | | | | | | | |
| 2 E to W ⇩ | | | | | | | ...⇧..⇧... | | | | | |
| ...⇨....⇨...... | | | | | | | | | | | | |
| 2M E to W ⇩ | | | | | | | | | | | | |

Fig. 13

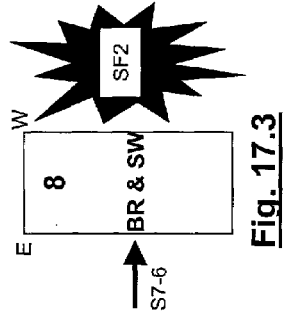
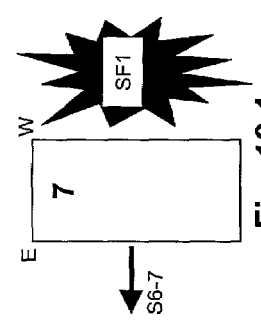
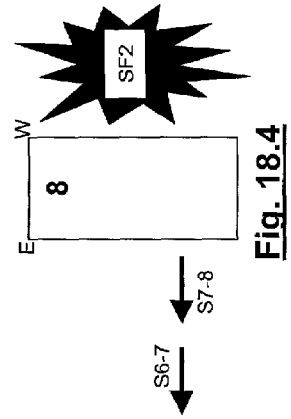
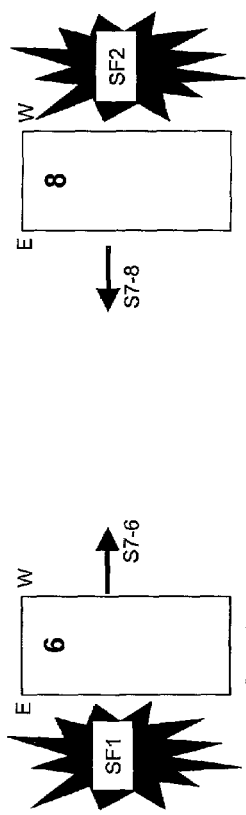
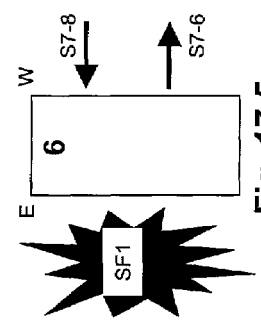
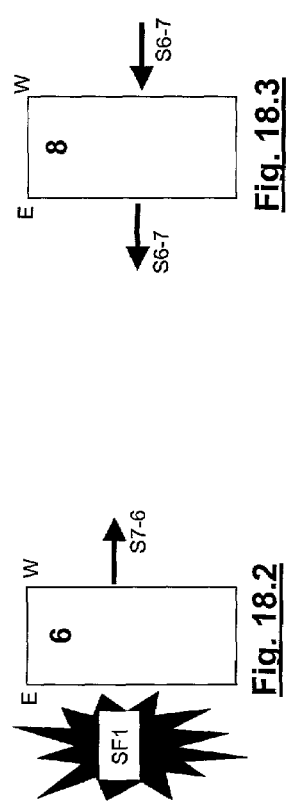
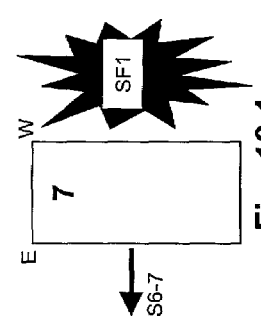
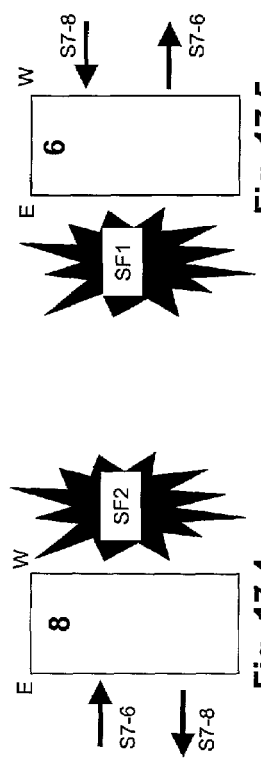

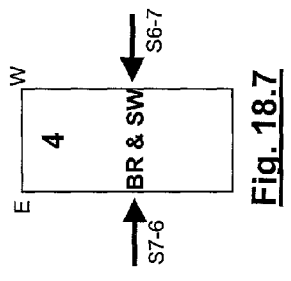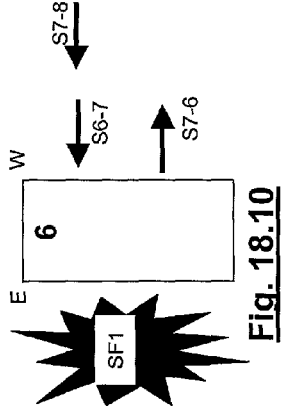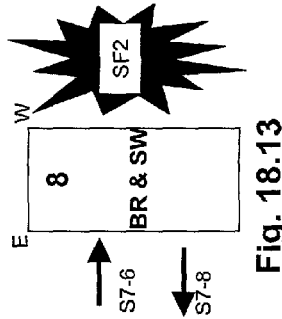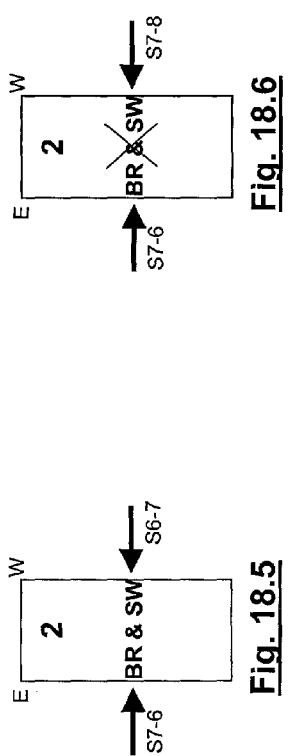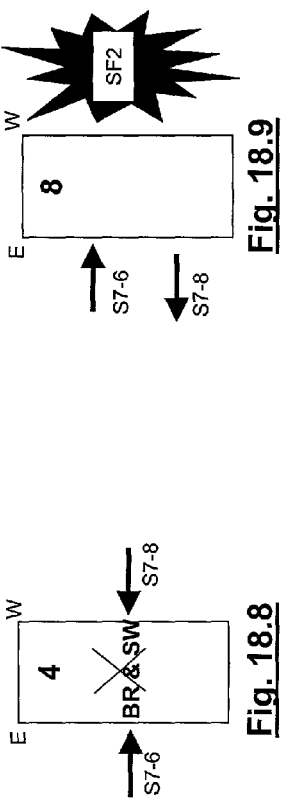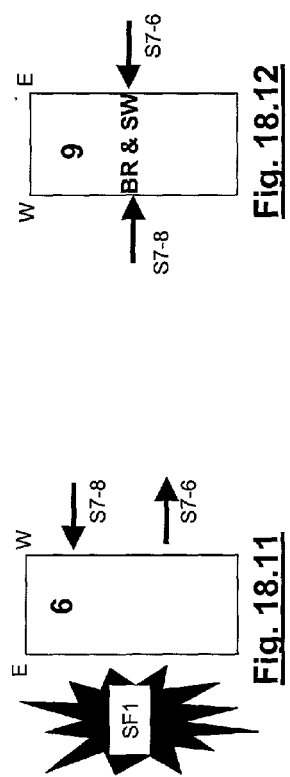

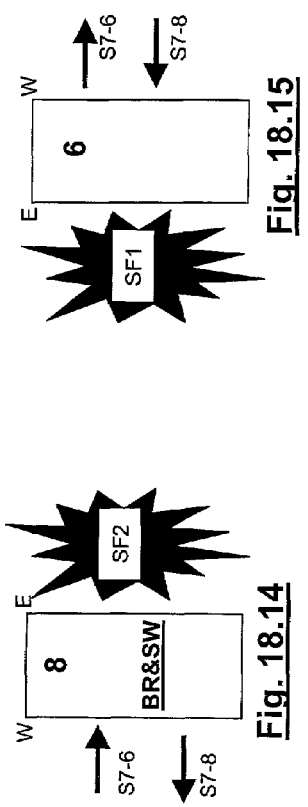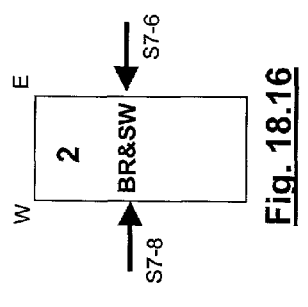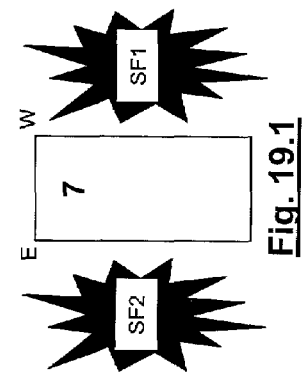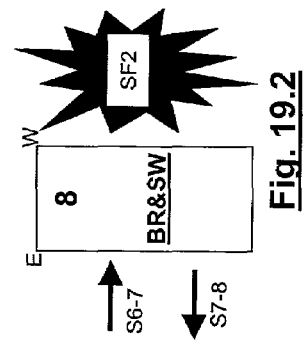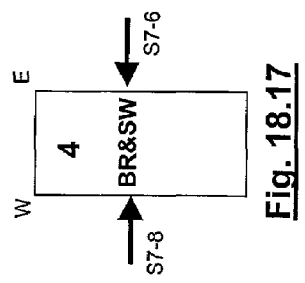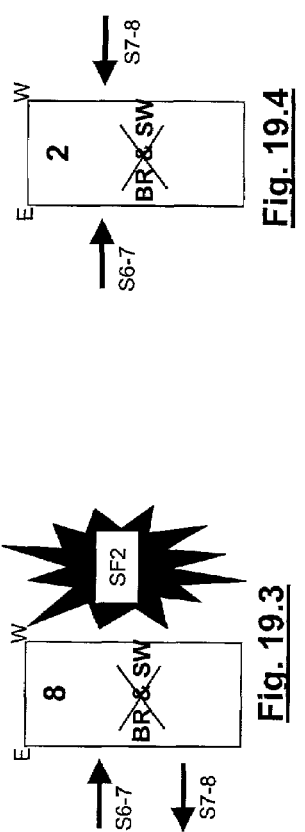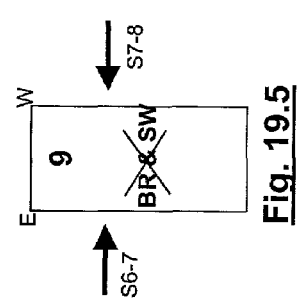

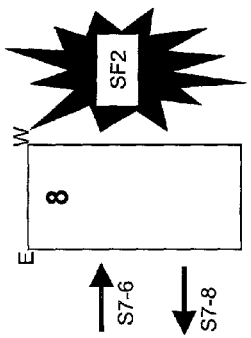
Fig. 19.7
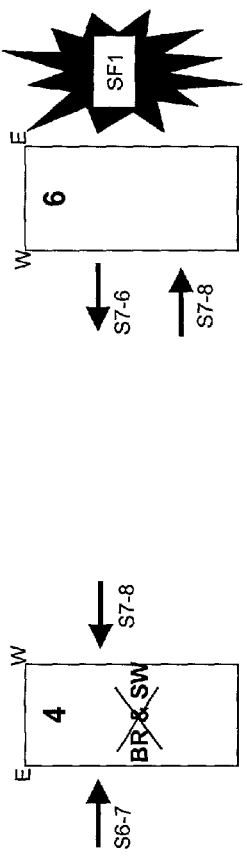
Fig. 19.6
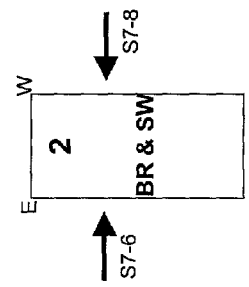
Fig. 19.8
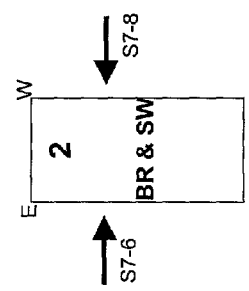
Fig. 19.10
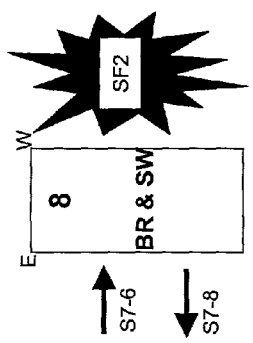
Fig. 19.9
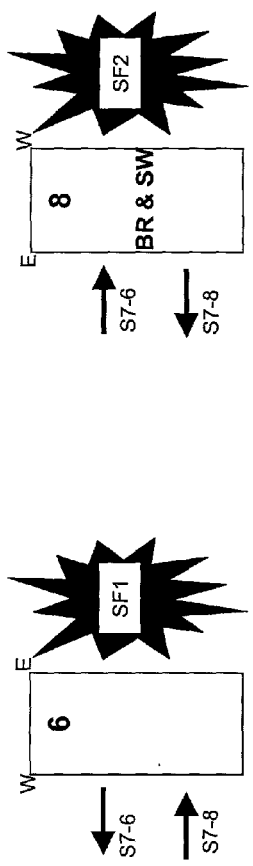
Fig. 19.11
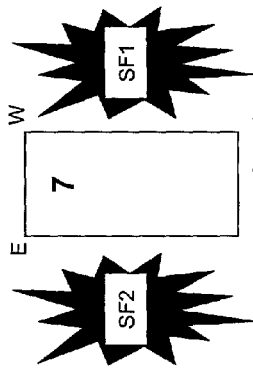
Fig. 20.1
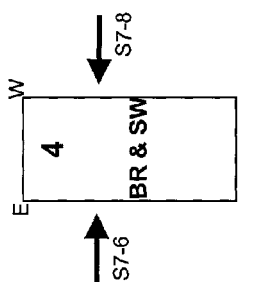
Fig. 19.13
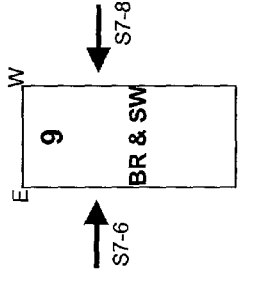
Fig. 19.12

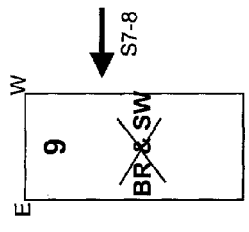
Fig. 20.4
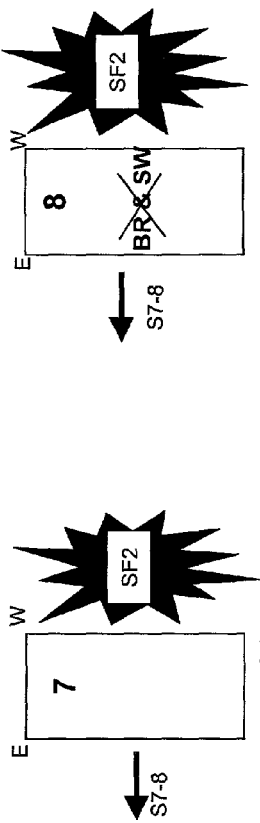
Fig. 20.3
Fig. 20.2
Fig. 21.1
Fig. 20.6
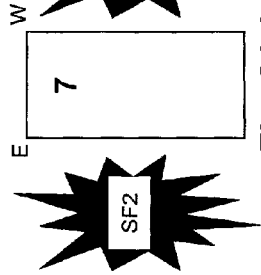
Fig. 20.5
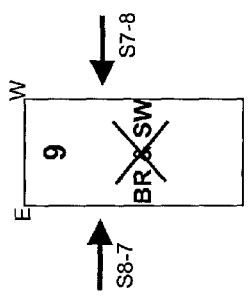
Fig. 21.4
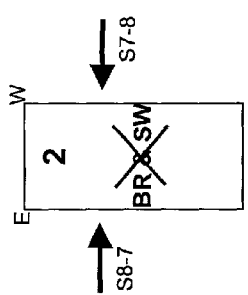
Fig. 21.3
Fig. 21.2

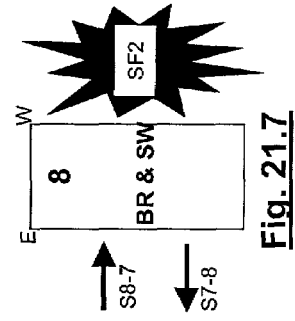
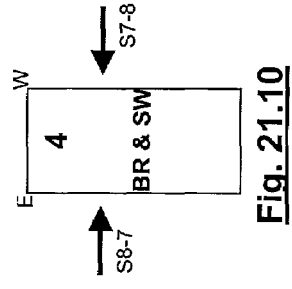
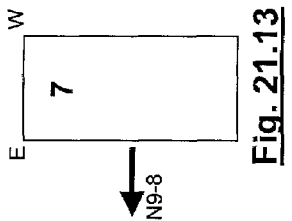
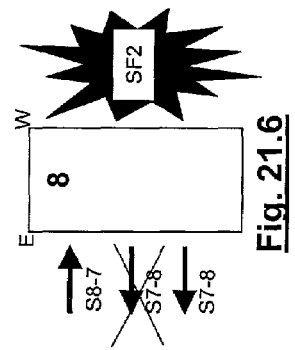
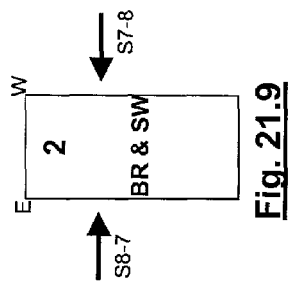
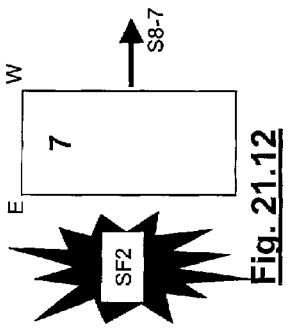
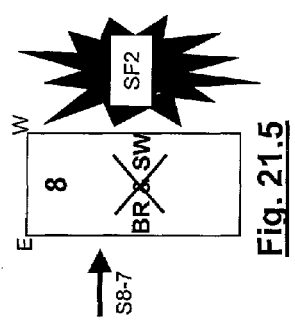
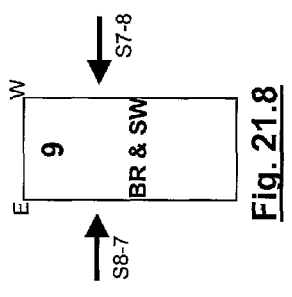
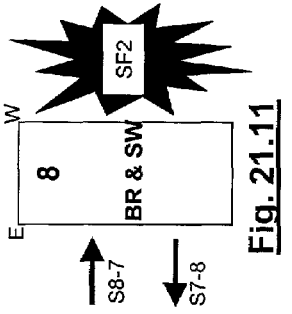

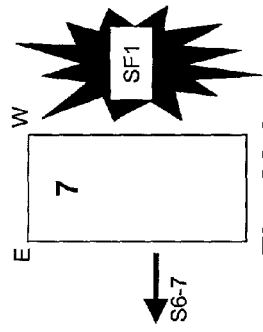
Fig. 22.2
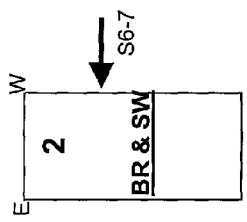
Fig. 22.5
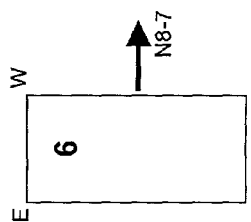
Fig. 22.8
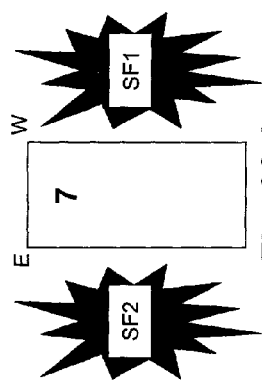
Fig. 22.1
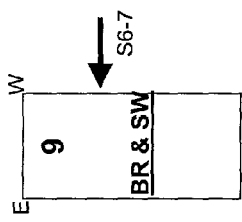
Fig. 22.4
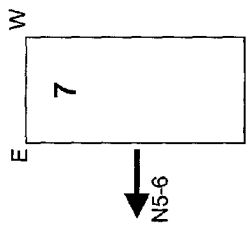
Fig. 22.7
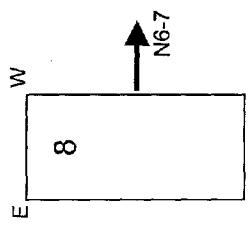
Fig. 21.14
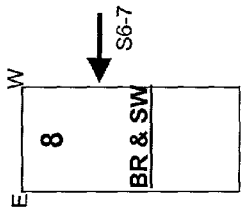
Fig. 21.3
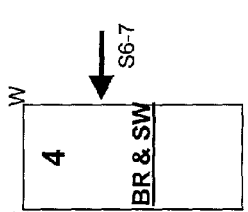
Fig. 22.6

METHOD OF MANAGING THE TRAFFIC PROTECTION IN OMS-SPRING NETWORKS

INCORPORATION BY REFERENCE OF PRIORITY DOCUMENT

This application is based on, and claims the benefit of, Italian Patent Application No. MI2001A001139 filed on May 30, 2001, which is incorporated by reference herein.

BACKGROUND OF THE INVENTION

1. Field of the Invention

The present invention relates to the management of optical networks arranged in a ring-configuration, and in particular to a method of managing the traffic protection in OMS-SPRING ring networks, wherein the change of allocation of the wavelengths in the traffic transit nodes is provided.

2. Description of the Prior Art

In the OMS-SPRING ring optical networks (Optical Multiplex Section-Shared Protection Ring), a shared protection mechanism is implementable which allows the automatic restoration of traffic in the presence of interchange causes (defects or failures in the connection fibers and/or in the optical elements which operate for the elaboration of the multiplexed optical signal). The OMS-SPRING networks can implement the automatic restoration of traffic through the synchronized re-routing of said traffic, which is possibly activated by each node of the configurated ring, and to be considered as a part of the protection scheme owing to the interchange reasons detected by the node itself. This operation is implementable through a protocol consisting of messages continuously interchanged between adjacent nodes.

In order to illustrate the present invention and the state of the art, it is considered as convenient to give a series of considerations and definitions.

In the optical networks are defined working wavelengths ($\lambda_{WK}$), utilized for carrying high priority traffic (Normal Traffic, NT), and protecting wavelengths ($\lambda_{PR}$) utilized for carrying the low priority traffic (Extra Traffic, ET). In each network element forming the optical ring network connection matrices are present. The following re-configuration actions of connection matrices are defined, which matrices are present in the nodes of the ring network, wherein the OMS-SPRING scheme is configurated:

"bridge", namely an action by which the data flow inserted in the generic working wavelength is inserted into the corresponding protecting wavelength through the contemporary insertion into both the wavelengths or through the selection of the only protecting wavelength.

"switch", namely an action by which the data flow is selected no more by the working wavelength, but by the corresponding protecting wavelength.

Furthermore, in connection with the implementation field of the above said actions, the following protection processes are defined:

"span switch": a protection process which is operated due to interchange reasons (failures or commands) detected at Optical Multiplex Section level in the fiber span which connects two of the nodes of the ring network under examination, and which causes the loss of only the high priority traffic carried on that span, that is makes the only working resource associated to that span unavailable. The span switch consists in the "bridge & switch" (BR&SW) action implemented in the nodes at the ends of the span affected by interchange cause, by exploiting the protecting resource which is available in the span itself.

"ring switch near end": a protection process which is operated due to interchange reasons (failures or commands) detected at Optical Multiplex Section level in the span which connects two of the nodes of the ring network under examination, and which causes the loss both of NT traffic and of ET traffic carried on that span, that is makes both the working and protecting resources associated to that span unavailable. The ring switch near end consists in the BR&SW action implemented in the nodes at the ends of the span affected by interchange cause, by exploiting the alternative path of the ring network which connects the two nodes implementing the action.

"ring switch far end": protection process which is operated due to interchange reasons (failures or commands) detected at Optical Multiplex Section level in the span connecting two of the nodes of the ring network under examination, and which causes the loss of both the NT traffic and the ET traffic carried onto that span, that is makes both the working and protecting resources associated to that span unavailable. The ring switch far end consists in the BR&SW action implemented in the termination nodes (add/drop) of high priority traffic carried in the span affected by the interchange cause, by exploiting the alternative path of the ring network which connects the two nodes implementing the action.

All the above said protection processes are of the "dual ended" type, that is with appropriate synchronization of the bridge and switch actions which are obtainable through a signaling protocol operating between the nodes of the network wherein the OMS-SPRING protection scheme is configurated, and through which the nodes adjacent to the span affected by an interchange cause (both span and ring), which nodes could be defined as "switching nodes", are signaling reciprocally the reason and the performed actions.

The aim of the present invention is not to define the syntax and the structure of the signaling protocol to be utilized for the management of the above mentioned protection processes (span switch, near end ring switch, far end ring switch), nevertheless, it is assumed that—whichever be the protocol utilized—at least the following information are to be interchanged between the nodes belonging to the protection scheme: Reason of the request, Source Node, Destination Node, Direction of Communication, Status of Protection. In particular:

"Reason of the request" indicates by an appropriate code—depending on a possible priority logic of the events—the type of failure;

"Source Node" indicates, by an appropriate code the ID of the node which generates the signaling;

"Destination Node" indicates, by an appropriate code, the ID of the node to which the signaling generated by the "Source Node" is addressed;

"Direction of Communication" indicates, by an appropriate code, the path which the signaling generated by the generic node is following to reach the adjacent node. It is possible to distinguish a "short" path, if the communication between both the nodes occurs directly through the connection span between them, from a "long" path when the communication between both the generic nodes can not occur through the connection span (because of failures) and therefore utilizes the remaining spans of the same ring;

"Status of protection" indicates, by an appropriate code, the re-configuration state of connection matrices, by distinguishing in principle among the following conditions:

No action, after the identification of an interchange cause and the beginning or modification of a protection process, namely, in general, when neither the "Bridge", nor the "Switch" actions are in progress (that is no modification of the re-connection matrices).

Bridge and Switch, after the reciprocal reception, by the switching nodes, of the signaling containing the "Status of protection" which indicates "no action".

Then, suppose in the specific case of ring switch (near end or far end), that the BR&SW actions can be implemented by the involved nodes, if the cause of the request is a failure classified at high priority (for example the break of a fiber and/or of a component) and the Status of protection indicates that no action has been implemented with the aim of optimizing the operation time of the protection mechanism and of limiting the traffic loss.

In addition, assume that—in the absence of interchange requests—the signaling is nevertheless generated by the generic node configurated by the OMS-SPRING scheme towards the adjacent node. For this purpose, in order to verify the matching of the received signals, it is necessary that each node of the ring receives, together with the configuration data, the information about the ring topology (or "ring map"), wherein the nodes forming the network are indicated with the relevant ID, as well as their position.

The OMS-SPRING ring networks can foresee a mechanism named "Wavelength Interchange", shortly WLI. By WLI it is indicated the configuration of a data traffic in a given ring network by allowing to such a traffic, which is carried in the n-th wavelength of OMS, to pass through a network element which is able to elaborate the protocol utilized for signaling, occupying numbers of λ which are different at the input and the output. If, for instance, the maximum capacity of a ring is of n λ, the WLI mechanism allows to enter a network element (a node of pure transit and wherein no termination of the signal carried by the wavelength is performed) with λ#X at its West (W) side and to go out from the East (E) side with a λ#Y, with X≠Y=1, 2 . . . , n. The advantage is a higher flexibility in the traffic allocation on the line resources and, therefore, an efficient band exploitation.

The protection process defined as span switch shows no implications which are relevant to the WLI mechanism: the span switch is managed within the span itself by both the end nodes. The possible allocation of traffic to be protected (in the adjacent spans) in a wavelength which is different from the one utilized in the span affected by an interchange cause, represents an outer function vis-à-vis the protection function and clearly has no influence on the protection process.

Nevertheless, more in general, the state of the art does not teach and nor suggest a mechanism for managing all the protection processes in an OMS-SPRING ring network, wherein the generic data flow—allocated on the high priority wavelength and subjected to protection—has been allocated on wavelengths which are different at the input and output of a generic node of the ring network which elaborates the signaling protocol utilized by the protection scheme.

SUMMARY OF THE INVENTION

The main object of the present invention is to indicate a method of managing the ring switch near end and ring switch far end protection processes, when the generic data flow, allocated on a protected high priority wavelength, has been allocated on wavelengths which are different at the input and output of a generic node of the ring network which elaborates the signaling protocol utilized by the protection scheme.

This and further objects is obtained through a method according to claim 1 and a network element according to claim 16. Advantageous features of the present invention are shown in the appended claims. All the claims should be considered as an integral part of the present description.

The basic idea of the present invention consists essentially in protecting the NT traffic by assigning, in case of a single failure of ring type, the wavelengths of the ET channels chosen according to the effective location of the failure. The criterion is the same both with the near end and far end processes; as already defined, the location of the BR&SW action in both the types of process is quite different. In case of double (or multiple) failure of ring type, the low priority wavelengths to be utilized for the protection are chosen according to appropriate criteria.

The invention will certainly become clear in view of the following detailed description, given by way of a mere non limiting and exemplifying example, to be read with reference to the attached figures.

BRIEF DESCRIPTION OF THE DRAWINGS

In the drawings:

FIG. 13 shows a possible representation of permutation table;

FIG. 17 show the signals received/generated by single nodes and the relevant actions undertaken in case of double contemporary failure (two failures at the same time);

FIG. 18 show the signals received/generated by single nodes and the corresponding actions undertaken in the case of double almost contemporary failure;

FIG. 19 show the signals received/generated by single nodes and the corresponding actions undertaken in the case of double failures in different times (first subscenario);

FIG. 20 show the signals received/generated by single nodes and the corresponding actions undertaken in the case of double failure in different times (second subscenario);

FIG. 21 show the signals received/generated by single nodes and the corresponding actions undertaken in case of restoring of a first failure; and FIG. 22 show the signals received/generated by single nodes and the relevant actions undertaken in case of elimination of a second failure.

BEST MODE FOR CARRYING OUT THE INVENTION

Figure 1:
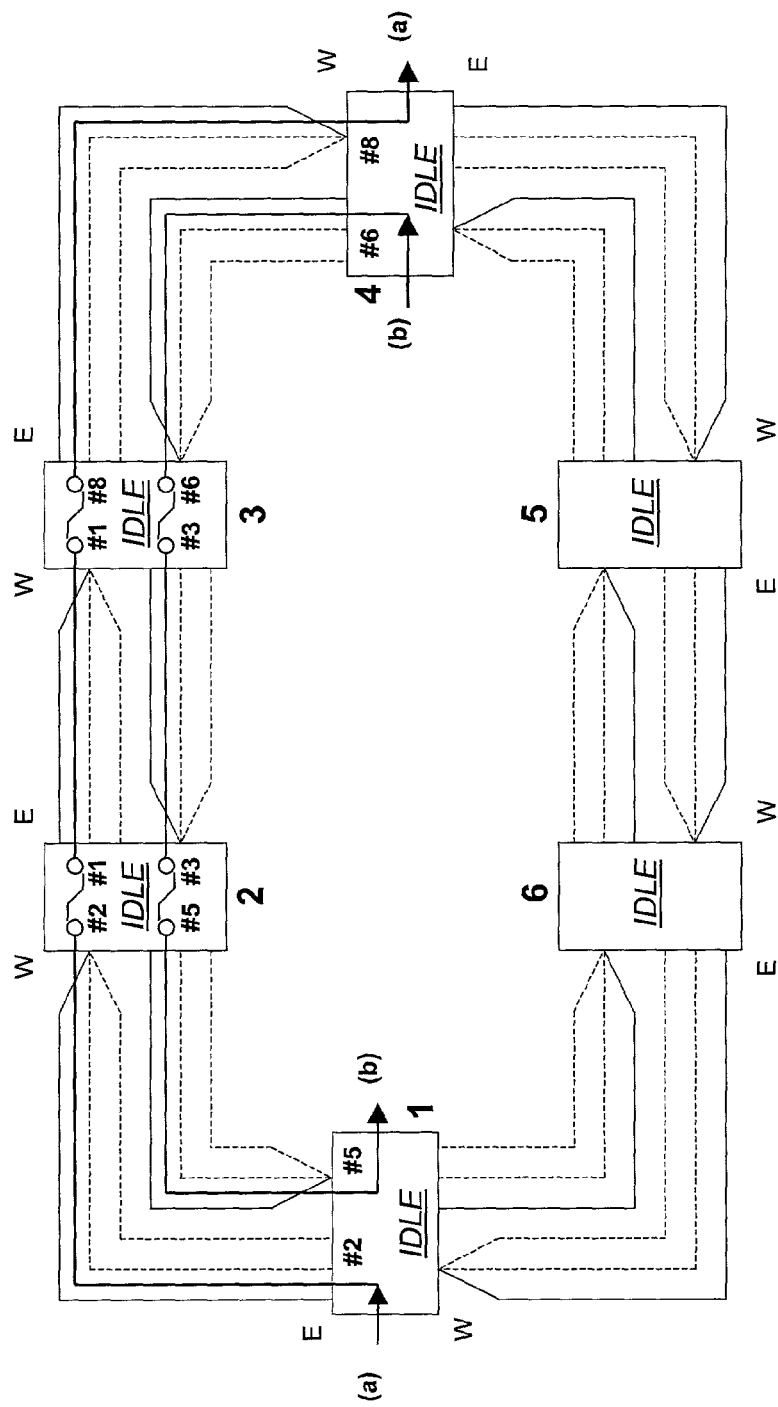
FIG. 1 shows a two-fiber ring network with a plurality of nodes, two data flows installed on different wavelengths along the ring, in a stable situation free of failures.

Clearly, the representation of two or four fiber ring networks is made only for example and on the basis of the currently used network topologies. It should be appreciated also that the method described is in principle applicable to topologies which consider also a number which is different from two or four physical carriers (fibers) utilized for the connection of the various ring network nodes: in particular, there is nothing against the use of the method described for single fiber rings, wherein different (working and protection) wavelengths in a bidirectional way are allocated. Further, the numbers assigned to the wavelengths shown in the examples is to be considered only for information and non-limiting.

The considerations are to be understood generically applicable to OMS-SPRING rings independently from the line capacities in terms of number of wavelengths supported by the ring itself. The already defined actions of bridge, switch and pass-through of wavelengths, relating to the span switch and ring switch (near and far end) processes already described are to be understood as independent from the technology utilized: in particular, the criteria so far explained are applied both to optical signals and actions implemented in an optical manner and to signals subjected to optical/electrical conversion (and viceversa) and to actions implemented in an electronic manner. Besides, the examples shown do not consider the presence of a possible extra-traffic configurable in the low priority channels and present when the ring is not requiring any protection process ("Idle" status), since it is not influencing the capacity of configurating and protecting the traffic in WLI: whichever ring switch requires, in fact, the removal of the whole ET in the relevant termination nodes and the following use of all the low priority channels for the operations of traffic protection configurated in the high priority channels.

The examples shown are to be read by considering that the FIGS. from 1 to 13 relate to the near end ring switch mechanism, while the FIGS. from 14 to 22 describe the method applied to the far end ring switch mechanism applied to two or four-fiber rings.

In the figures relevant to two-fiber rings, the working capacity (consisting of working wavelengths or "$\lambda_{WK}$") has been indicated by the half-arrows continuously bordered in the arrows which represent the connections between the ring nodes, while the protection capacity (consisting in protecting wavelengths or "$\lambda_{PR}$") has been indicated by half-arrows bordered by fine broken lines.

In the Figures relevant to four-fiber rings, the working fibers (carrying the $\lambda_{WK}$) have been indicated by continuously bordered arrows, while the protection fibers (carrying the $\lambda_{PR}$) have been indicated by arrows bordered by broken lines.

The ring which has been used to describe the present invention comprises, both in the two- and four-fiber schemes, six network elements or nodes, indicated by rectangles and numbered with the respective numbers (from 1 to 6). Of each node the West (W) and East (E) sides are indicated. "Span" is a fiber length between two nodes, for example the fiber length between the nodes 1 and 2 or the fiber length between the nodes 5 and 6.

In the various Figures, by way of a mere non limiting and exemplifying example, one or two data flows have been illustrated and installed, "data flow (a)" and "data flow (b)". The data flows have been illustrated by a continuous bolt line and by arrows to indicate the traffic direction and therefore the nodes where the data flows are inserted or extracted. For example, in FIG. 10 the data flow (a) is inserted at NE1 and is extracted at NE4; the data flow (b) is inserted at NE3 and is extracted at NE2.

Then, it has been also clearly indicated (by numbers preceded by the "#" symbol) the various wavelengths, wherein the various data flows have been allocated, span-by-span. So, it has been also indicated if a Wavelength Interchange (WLI) occurs in a node or if that node allows that data flow to transit without changing the $\lambda$, wherein it is allocated.

As already said, the basic idea of the present invention consists substantially in protecting the NT traffic by assigning, in case of single interchange cause of ring type, the wavelengths of the ET channels chosen according to the effective location of the interchange cause. The mentioned criterion is the same both with near end and far end process; as already defined, the location of the BR&SW action in both the types of process is quite different. In case of double (or multiple) ring type failure, the wavelengths of the ET channels to be utilized for the protection are to be chosen according to proper criteria.

In particular, the present invention foresees the general criteria hereunder explained:

I. Single Interchange Cause

After a ring type interchange cause has been revealed in a given span, the nodes adjacent to said span enter the switching status and are defined switching nodes. The switching nodes will issue proper signals which travel through the ring in opposite directions. The BR&SW action is implemented:

by the switching nodes, in case of "near end ring switch"

by the termination nodes (nodes wherein the data flow to be protected is inserted into the ring or extracted from the ring) of the data flow allocated in the $\lambda_{WK}$, in the case of a far end ring switch.

In both the cases, this activity defines the series of re-routable data flows, namely all the data flows, the nominal route of which includes the span affected by a failure.

The other nodes of the ring are, in both the cases, in the Pass-Through status and implement the pass-through of the protecting wavelengths ($\lambda_{PR}$) and of the signaling generated by the switching nodes as well.

According to the present invention, in case of a single interchange reason in a ring network protected through an OMS-SPRING protection mechanism by WLI, the BR&SW action, represented by the ring switch near end or far end is implemented by utilizing the protecting wavelength ($\lambda_{PR}$) corresponding to the working wavelength ($\lambda_{WK}$) allocated in the span affected by a failure. The choice criterion of $\lambda_{PR}$ to be used for the protection is the one chosen for implementing, in general, the ring switch (near o far) process.

A possible implementation is the following: given a ring line signal OMS-n, where n is the overall number of the handled wavelengths, being defined as "$\lambda_{WK}$", those comprised between 1 and n/2 and "$\lambda_{PR}$", those comprised between n/2+1 and n, it results that $\lambda_{PR}=\lambda_{WK}\#(X+n/2)$, where X is just the index of $\lambda_{WK}$ in the span affected by a failure. The criterion just described is fitted for rings, wherein the connection between the various nodes is implemented by a single fiber or by two (or more) fibers.

In the case of ring tolopogies comprising at least two physical carriers (fibers) for the connection between nodes forming the ring itself, a possible alternative is the following: given a ring line signal OMS-n (associated to each physical carrier), where n is the number of the wavelengths handled, having both the "$\lambda_{WK}$" and the "$\lambda_{PR}$" the same index comprised between 1 and n, it results that $\lambda_{PR}=\lambda_{WK}\#X$, where X is the index of the $\lambda_{WK}$ in the span affected by a failure. There is no risk of conflicts since the assigning criterion of protecting wavelengths (or $\lambda_{PR}$) is the same as for all the spans affected by a failure.

II. Double Interchange Cause

In case of a ring type interchange cause at another span and the data flow can be yet restored, then II.I) II.I.I) the present re-routing is released;

II.I.II) between the two spans that are affected by a failure, a span is chosen according to a certain criterion; and II.I.III) the data flow is re-routed on the $\lambda_{PR}$ corresponding to the $\lambda_{WK}$ of the span affected by the failure which has been chosen.

In case of multiple failures (more than two), the choice of the span to be considered for the protection of the flow in WLI is to be made by choosing according to the above said criterion between two spans which are adjacent to the switching nodes which can communicate with the termination nodes of the data flow to be protected. There is no risk of conflict since the assigning criterion of the protecting wavelengths is equal for all the working wavelengths affected by a failure. In the case of far end ring switch, the possible misconnections in the transient ring states are avoided.

II.II) the present re-routing is not released when the persistency of the re-routing information is supported by the ring network elements. This alternative is valid only for the far end ring switch.

Hereunder are indicated the procedures implemented by each ring node (in addition to the procedures which are already described) in order to protect the data flow subjected to WLI if the transit nodes (where the WLI is implemented) result isolated. Such procedures are to be applied only to the near end ring switch case.

In case that one or more nodes (with WLI) become isolated, after two or more failures of ring type in different spans, the ring network can be seen as divided into two separated sub-networks.

Therefore, the switching nodes verify if the termination nodes of the data flow which passes through the isolated node belong to the first or the second sub-network, that is if they can communicate one with each other. This check is to be carried out by comparing the position of the failure (known on the ground of the detected interchange criteria and the received signaling) with the configuration data, which carry the information of the whole allocation of the data flow in the WLI in the ring. In particular, it is necessary that all the nodes involved in the allocation of the WLI data flow be aware of the whole allocation of the data flow itself. Such information can be given to the node, in the form of a table (called "Permutation Table") configurable during the traffic installation phase.

Each data flow allocated in the spans affected by an interchange cause is re-routed on the protecting wavelength corresponding to the working wavelength of the span affected by the interchange cause which has been selected according to a certain criterion. The criterion adopted to choose one between the failed spans could be for example one of the following ones:

i) it is chosen the failed span adjacent to the switching node having the higher (or lower) node ID;

ii) it is chosen the failed span adjacent to the switching node coming first (or last) in the ring map; or iii) it is chosen the failed span adjacent to the switching node which is "more at West" or "more at East" in the ring.

It should be realized that, in case of multiple interchange causes (more than two ring failures), the choice of the span to be considered for the determination of the protecting wavelength to be utilized should be made, according to the above said criterion, among the two spans affected by a failure adjacent to the switching nodes and able to communicate with the termination nodes of the data flow to be protected.

Hereunder, the procedures implemented by each ring node (in addition to the procedures which have already been described) depending on the content of the signals received will be indicated. Such procedures are to be applied only to the far end ring switch case, for which it is assumed the possibility of implementing the "BR&SW" action at the termination nodes of the data flow to be protected (in view of the reception of the signaling containing the indication of "Interchange cause" and a "Status of protection=no action" attributable to the switching nodes). In particular:

A. Termination Node—Single Failure/Event—
  —Ring Switch Far End—

If, at the W and E sides of the node two signals indicating an interchange request of ring type concerning the same span (single failure) are revealed, with the code of "Status of protection" indicating that the signaling generated by the generic switching node is in the beginning phase ("no action"), then each working data flow configurated in the span in question is re-routed on the corresponding $\lambda_{PR}$ (possibly equal) to the $\lambda_{WK}$ of the (only) span affected by a failure. In other words, if the node in question is a termination node of the working data flow affected by a failure, the BR&SW action is implemented by utilizing the protecting wavelength corresponding (possibly equal) to the working wavelength of the span affected by a failure.

A1. Intermediate Node—Single Failure/Event—
  —Ring Switch Far End—

If, at the W or E sides of the node at least a signaling indicating an interchange request of ring type is revealed, the code of "Status of protection" bearing a value showing "no action", if necessary the pass-through of the protecting wavelength utilized for the protection of the corresponding working wavelength affected by a failure (possibly equal) is performed.

B. Termination Node—Double or Multiple Failure/Event —Ring Switch Far End—

If, at the W and E sides of the node two signals indicating an interchange request of ring type regarding two different spans (double or multiple event) are revealed, the code of "Status of protection" bearing the value indicating BR&SW of the protection mechanism (or after the reciprocal reception of the signaling containing the code of status "no action"), then each data flow allocated in the involved span is re-routed on the protecting wavelength corresponding (possibly equal) to the working wavelength of the span affected by a failure which has been chosen on the ground of a pre-fixed criterion. The criterion for the selection of one among the failed spans could be for example one of the following:

i. selection of the failed span adjacent to the switching node having the higher (or lower) node ID;
ii. selection of the failed span adjacent to the switching node coming first (or last) in the ring map; or
iii. selection of the failed span adjacent to the switching node which is "more to West" or "more to East" in the ring.

Similarly for the case A, as above said, if the involved node is a path termination node (namely a node wherein the path to be re-routed is inserted or extracted), it is implemented the BR&SW action by utilizing the protecting wavelength corresponding (possibly equal) to the working wavelength of the preselected span affected by a failure.

B1. Intermediate Node—Double or Multiple Failure/Event —Ring Switch Far End—

If, at the W or E sides of the node, at least a signaling which indicates a ring type interchange request is revealed, the code of "status of protection" indicating that the signaling is generated by one of the two switching nodes in the "BR&SW" status, a pass-through is implemented, if necessary, by utilizing the same protecting wavelength.

C. Single Failure Followed by Another Failure —Ring Switch Far End—

In an optimized implementation, wherein a flow re-routing is already in progress due to a single failure, if at the W and E sides of the node there are revealed ring type interchange requests with a non homogeneous code of "status of protection" (that is "no action status" and "bridge and switch status") reporting the indication of a second failure, localized in a different span, then, for each data flow already re-routed, it is necessary to evaluate if the new requests represent a failure status which requires to release or not the present re-routing. It is not necessary to release the present re-routing of a single path in the following cases: i) when a failure is noted in addition to the already existing failure/s (and such new failure/s does/do not determine the "isolation" condition of any termination node of the already protected data flow); or ii) when the last failure in the span has been removed.

It is to be understood how the persistency of the re-routing condition of the data flow be strictly bound to the coexistence of the above said triggers on both the sides of the node. This behaviour guarantees the correct re-routing of the flows affected by a failure, namely it avoids that misconnections are established during the transient states of the ring protection mechanism.

It is to point out that the above said is applicable to the case of bidirectional data flow and unidirectional data flow when the reverse route is not used. Clearly, if two unidirectional flows are allocated on the same working wavelength (in opposite directions), then the same protecting wavelength can be assigned to both the data flows.

The concepts mentioned above in general terms will be considered again by applying them to specific cases illustrated in the various figures.

Figure 2:
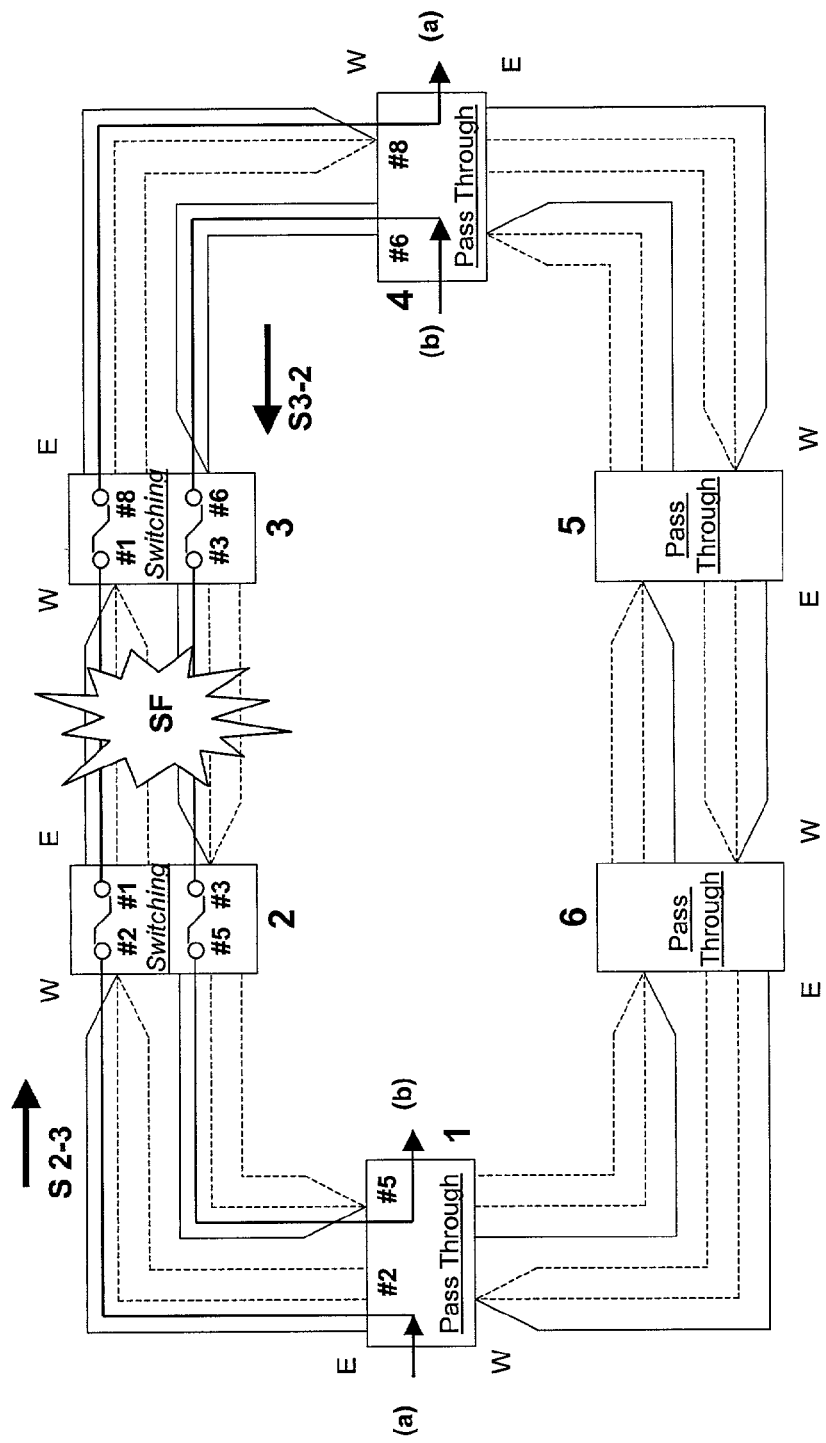
FIG. 2 shows the same ring network of FIG. 1 immediately after a ring failure has occurred.
Figure 3:
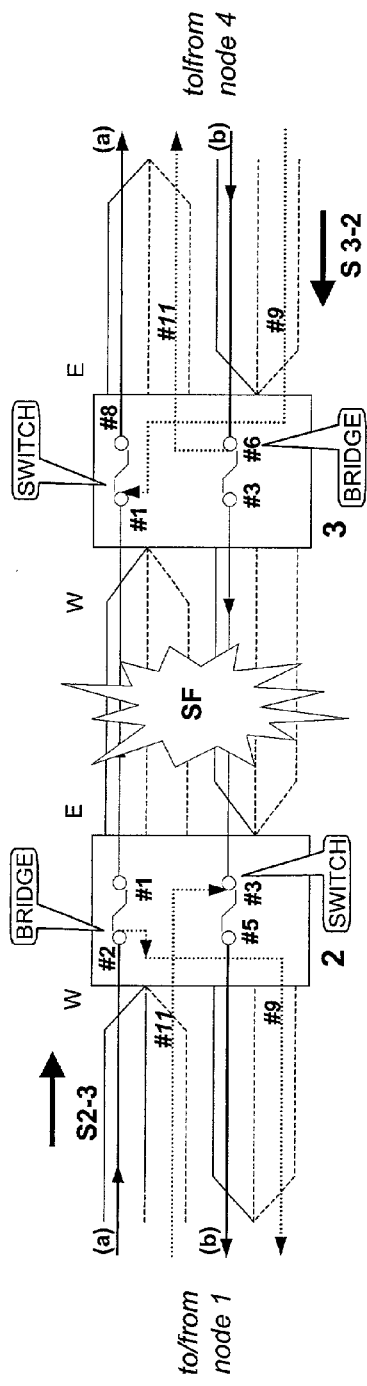
FIG. 3 shows the Bridge & Switch near end action implemented at the nodes which could be defined as those adjacent to the span affected by a "switching" failure of the ring network of FIG. 2.

Initially, the case of a single failure in a two-fiber ring network will be considered (FIGS. 1–3). In a free-of-failure condition (FIG. 1), a first unidirectional data flow (the data flow (a)) is inserted into the ring at the network element 1 (NE1) and allocated on the $\lambda_{WK}$#2; in NE2 there is a change of allocation from $\lambda_{WK}$#2 to $\lambda_{WK}$#1; in NE3 there is another allocation change from $\lambda_{WK}$#1 to $\lambda_{WK}$#8; finally, the data flow (a) is extracted from the ring at NE4. Similarly, a second unidirectional data flow (the data flow (b)) is inserted into the ring at NE4 and allocated on the $\lambda_{WK}$#6; in NE3 there is a change of allocation from $\lambda_{WK}$#6 to $\lambda_{WK}$#3; in NE2 there is another change of allocation from $\lambda_{WK}$#3 to $\lambda_{WK}$#5; finally, the data flow (b) is extracted from the ring at NE1. The nodes do not detect any interchange request ("Idle" status).

Assume (see FIG. 2) that a failure (SF) of ring type in the span 2–3 of the ring happen. The nodes 2 and 3 become "switching" nodes. The switching nodes 2 and 3 issue, one to each other, appropriate signalings which will travel in the ring in opposite directions and will signal, by an appropriate code, at least the following information: Cause of request, Node of Destination, Source Node, Direction of Communication, Status of Protection.

The Bridge & Switch action is implemented (ring switch near end) by the switching nodes 2 and 3, while the other nodes of the ring are in "Pass-Through" and implement the pass-through of $\lambda_{PR}$ and of signaling generated by the switching nodes.

According to the present invention, in case of a single failure in a ring network protected through an OMS-SPRING protection mechanism with WLI, the Bridge & Switch action represented by the ring switch near end is implemented by utilizing the protection wavelength corresponding to the working wavelength allocated in the span affected by a failure. The choice criterion of $\lambda_{PR}$ to be utilized for the protection is that chosen to implement, in general, the ring switch near end process. In the hypothesis to define, given n $\lambda$ of the generic line signal of OMS-n ring, "$\lambda_{WK}$", those comprised between 1 and n/2 and "$\lambda_{PR}$", those comprised between n/2+1 and n, it results that $\lambda_{PR}=\lambda_{WK}\#(X+n/2)$, wherein X is the index of $\lambda_{WK}$ in the span affected by the failure. With reference to FIG. 3, the data flow (a), which in the span affected by SF is allocated on the $\lambda$#1, will be allocated on the $\lambda$#9, still supposing that n=16. In an analog manner, the data flow (b), which in the span affected by SF is allocated on the $\lambda$#3, shall be allocated on the $\lambda$#11, always with the hypothesis of n=16. The implementation above described is fitted for single or two-fiber ring topology and constitutes a choice criterion example of protecting resource vis-à-vis the corresponding working resource to be protected: the criterion just described is applicable to whichever rule which binds the generic working resource allocated in the generic span of the ring to the corresponding protecting resource of the same span.

Figure 6:
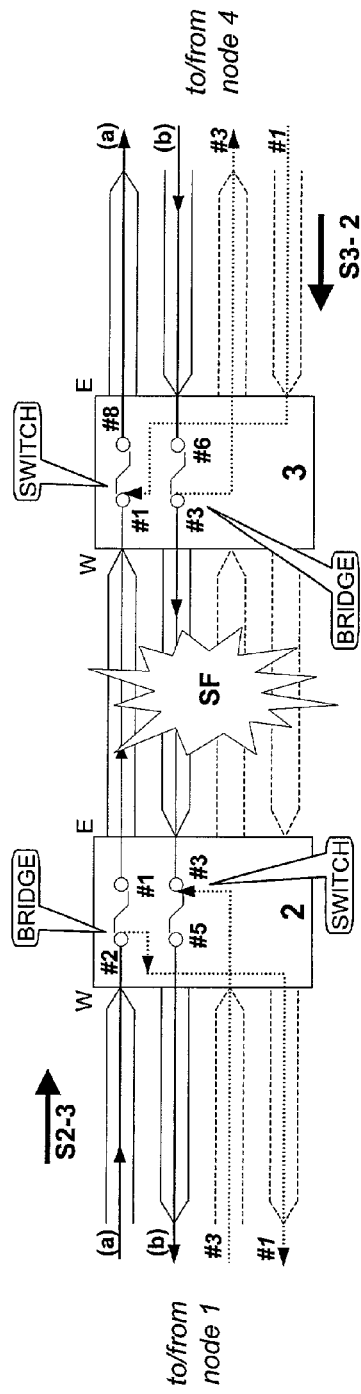
FIG. 6 shows the Bridge & Switch action implemented at the nodes which could be defined as "switching" nodes of the ring network of FIG. 5.
Figure 4:
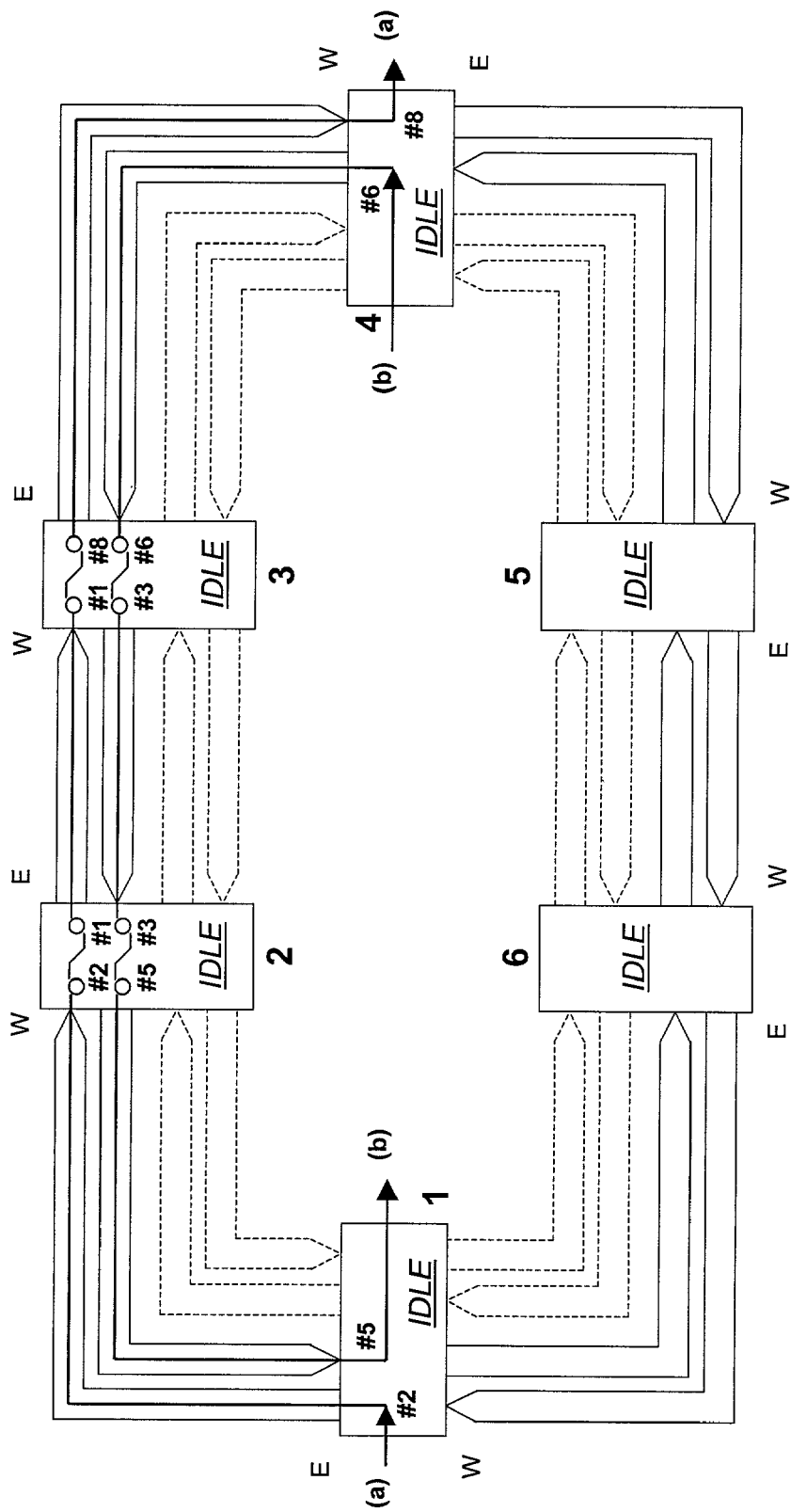
FIG. 4 shows a four-fiber ring network with a plurality of nodes, two data flows installed on different wavelengths along the ring in a stable situation free of failures.
Figure 5:
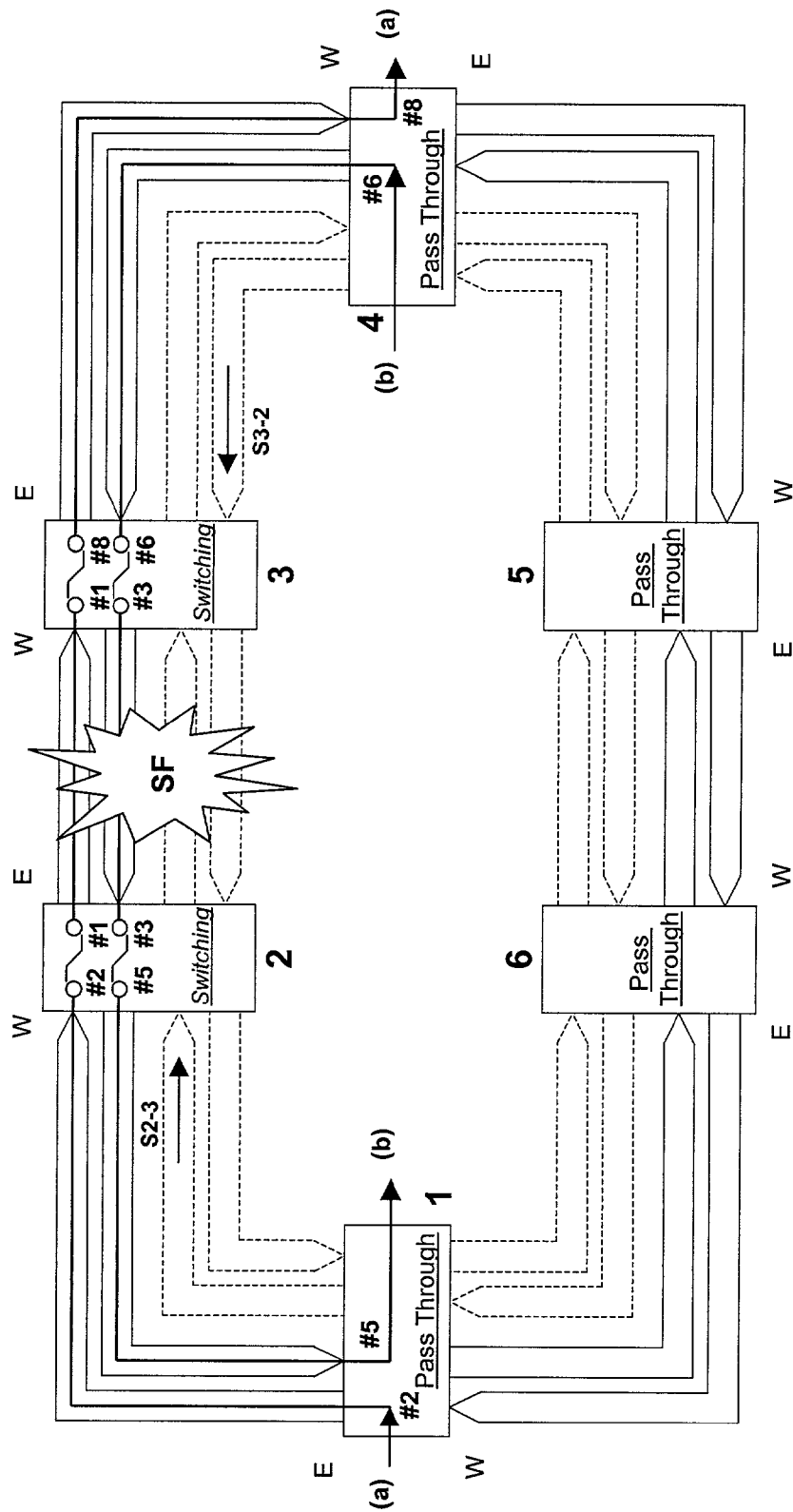
FIG. 5 shows the same ring network as per FIG. 4 immediately after a ring type failure.

For this purpose, it is to be considered the case of a single failure in a four-fiber ring network (FIGS. 4–6). In such ring topology it is assumed that two fibers of the generic span be dedicated to the transport of the "working" wavelengths, in both the transmission directions and the remaining two fibers be dedicated to the transport of "protecting" wavelengths, in the both transmission directions. The faultless scenario (FIG. 4) is similar to the one of FIG. 1: a first unidirectional data flow (the data flow (a)) is inserted into the ring at NE1 and allocated on the $\lambda_{WK}$#2; in NE2 there is a change of allocation from $\lambda_{WK}$#2 to $\lambda_{WK}$#1; in NE3 there is another change of allocation from $\lambda_{WK}$#1 to $\lambda_{WK}$#8; finally, the data flow (a) is extracted from the ring at NE4. Similarly, a second unidirectional data flow (the data flow (b)) is inserted into the ring at NE4 and allocated on the $\lambda_{WK}$#6; in NE3 there is a change of allocation from $\lambda_{WK}$#6 to $\lambda_{WK}$#3; in NE2 there is another change of allocation from $\lambda_{WK}$#3 to $\lambda_{WK}$#5; finally, the data flow (b) is extracted from the ring at NE1. All the nodes are in the Idle status.

Assume (see FIG. 5) that a failure (SF) of ring type happens in the span 2–3 of the ring. The nodes 2 and 3 become switching nodes. The switching nodes 2 and 3 will interchange appropriate signalings which travel in the ring in opposite directions, the signalings having the already described contents.

The Bridge & Switch action is implemented (ring switch near end) by the switching nodes 2 and 3, while the other nodes of the ring are placed in the state of "pass-through" and implement the pass-through of $\lambda_{PR}$.

In view of the topology of the network under examination, that is four fibers, wherein each fiber carries n $\lambda_{WK}$ and n $\lambda_{PR}$ in both the transmission directions, the choice criterion of "$\lambda_{PR}$" to be utilized for the protection can be so that if n is the overall number of the handled wavelengths it results that $\lambda_{PR}$=$\lambda_{WK}$#X, where X is the index of $\lambda_{WK}$ in the span affected by a failure.

In other words (FIG. 6), the data flow (a) which, in the span affected by SF is allocated on the $\lambda_{WK}$#1, will be allocated on the $\lambda_{PR}$#1. Similarly, the data flow (b), which in the span affected by SF is allocated on the $\lambda_{WK}$#3, shall be allocated on the $\lambda_{PR}$#3.

Figure 7:
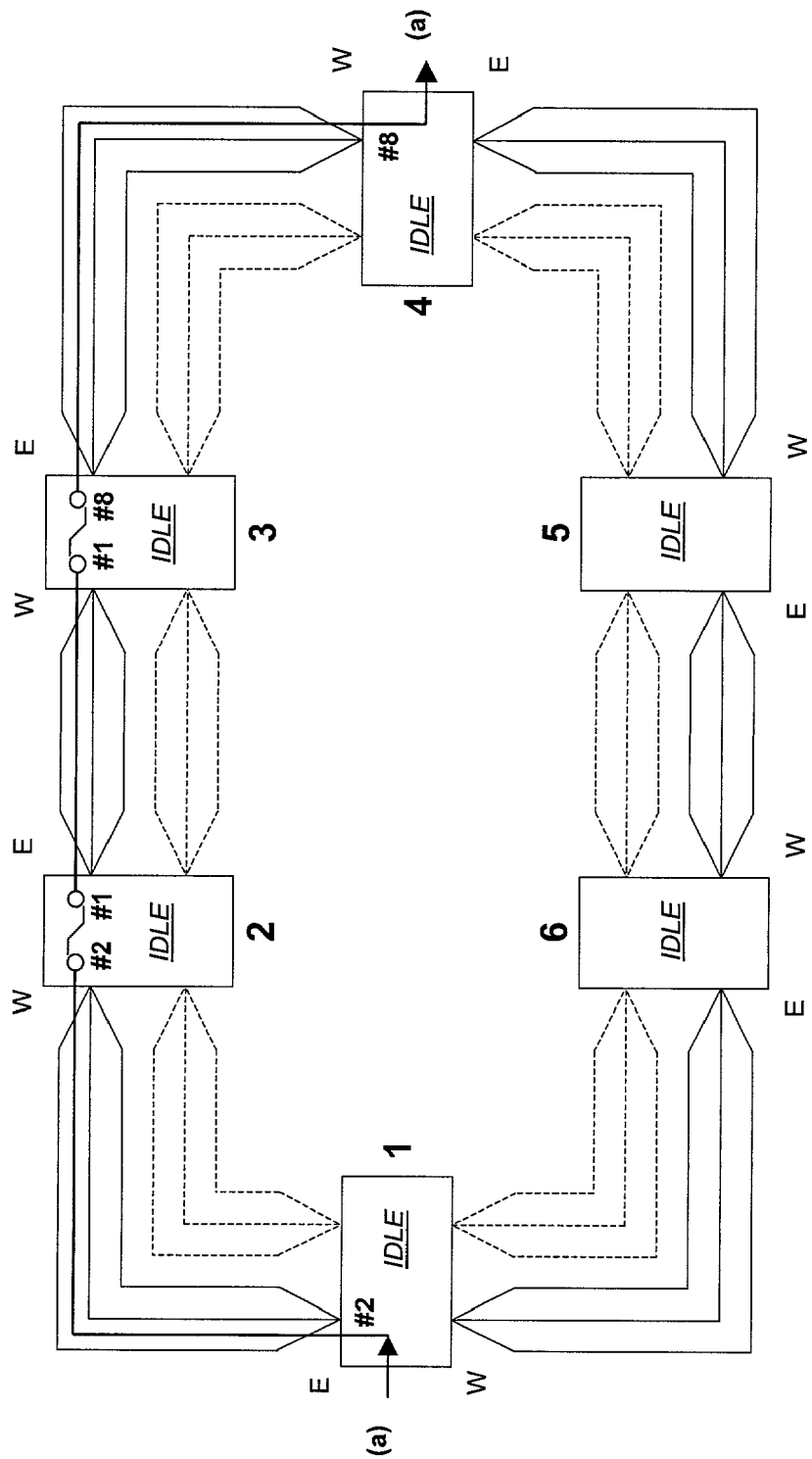
FIG. 7 shows a two/four-fiber ring network with a plurality of nodes, a single data flow installed on different wavelengths along the ring in a stable situation free of failures.

In order to illustrate the case of several spans affected by a failure, resulting in a consequent isolation of one or more network elements, a "generic" pictorial representation shall be utilized (valid both for two-fiber and four-fiber rings) of FIG. 7. The connections between nodes have been represented in a bidirectional manner. Furthermore, in order to facilitate the understanding of the various figures, it is shown a single data flow (data flow (a)) installed. The data flow (a) is inserted in NE1 and allocated on the $\lambda$#2; in NE2 a change of allocation from $\lambda$#2 to $\lambda$#1 occurs; in NE3 a change of allocation from $\lambda$#1 to $\lambda$#8 occurs; the data flow (a) is terminated in NE4. In a free-of-failure condition, all the nodes are in the idle status.

Assume that a first failure SF1 occurs in the span 1–2: the nodes 1 and 2 become switching nodes. Assume that a second failure SF2 occurs in the span 2–3: also NE3 becomes a switching node. NE2 shall remain isolated from the ring. The switching nodes 1 and 3 will send corresponding signals towards NE2 with the respective interchange requests for SF1 and SF2: once that both of them have received an interchange request addressed to NE2, the isolation of NE2 is ascertained.

Thus, the ring network becomes divided in two sub-networks (FIG. 8): a first sub-network (sub-network A) comprising all the nodes excepting the isolated node 2 and a second sub-network (sub-network B) comprising NE2.

Therefore, the switching nodes check if the termination nodes of the data flow which passes through the isolated node belong to the first or the second sub-network, that is if they are able to communicate with them. This check is implemented by comparing the failure position with the configuration data bearing the information of the entire allocation of the data flow in WLI in the ring (the information is available in all the nodes involved in the allocation itself). In the example illustrated in FIG. 8, the termination nodes of data flow (a), which passes through the isolated node 2, belong to the sub-network A: the data flow is to be protected by using, according to one of the criteria already mentioned, the $\lambda_{PR}$ associated to $\lambda_{WK}$ utilized for the allocation of the same data flow in one of the two spans affected by a failure.

Figure 9:
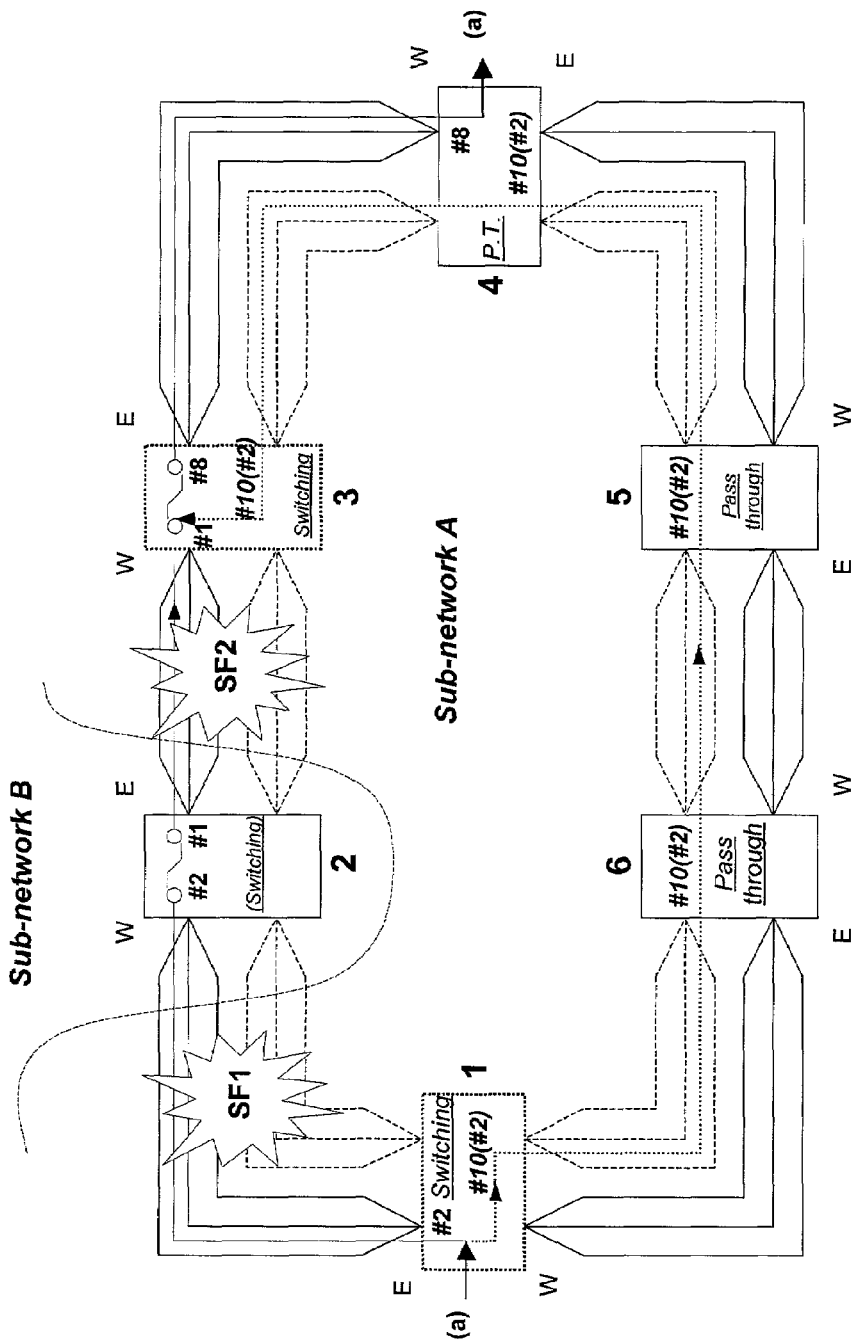
FIG. 9 shows a possible criterion by which it is possible to protect the data flow as per FIG. 8.

It is assumed, given by way of a mere non limiting and exemplifying example, to adopt the criterion which was above indicated by "i)". The switching nodes which have to implement the "Bridge & Switch" action are the nodes 1 and 3 which belong to the sub-network A. The switching node having the lower ID code is NE1; the span affected by a failure which is adjacent to the switching node with a lower ID code is therefore the span 1–2; the data flow (a), in the span 1–2 is allocated on the $\lambda_{WK}$#2. Therefore, if n=16, for the re-routing it is necessary to utilize $\lambda_{PR}$#(2+8), namely $\lambda_{PR}$#10, while in the case of a four-fiber ring, for the re-routing, it is necessary to utilize $\lambda_{PR}$#2 in agreement with the principles expressed for the single failure. In FIG. 9, the path of the re-routed data flow has been indicated by a dashes line; the index of $\lambda$ relevant to a four-fiber ring has been indicated in brackets.

Figure 8:
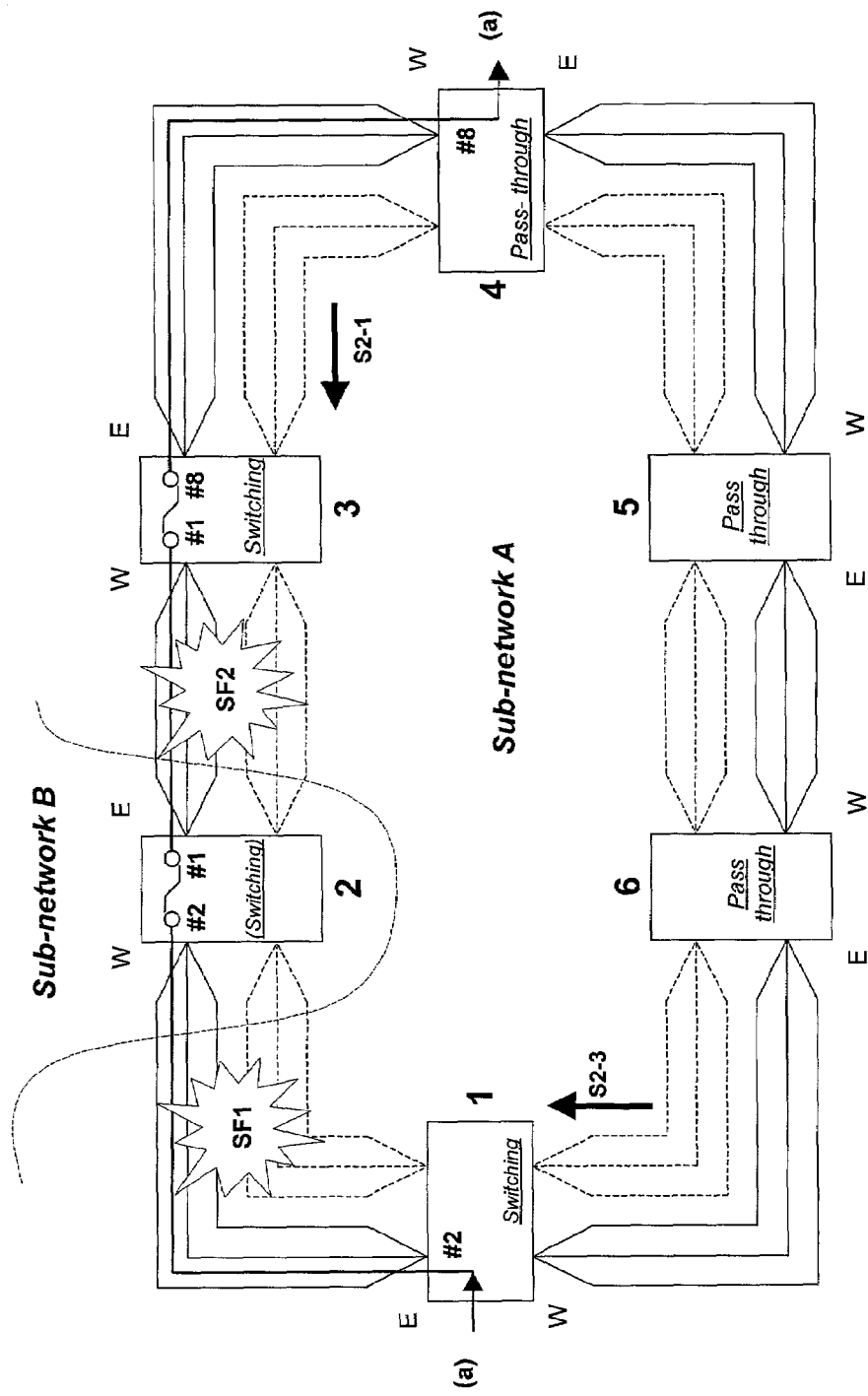
FIG. 8 shows the network of FIG. 7 in case of double failure causing an isolation of a node and the identification of two sub-networks.
Figure 10:
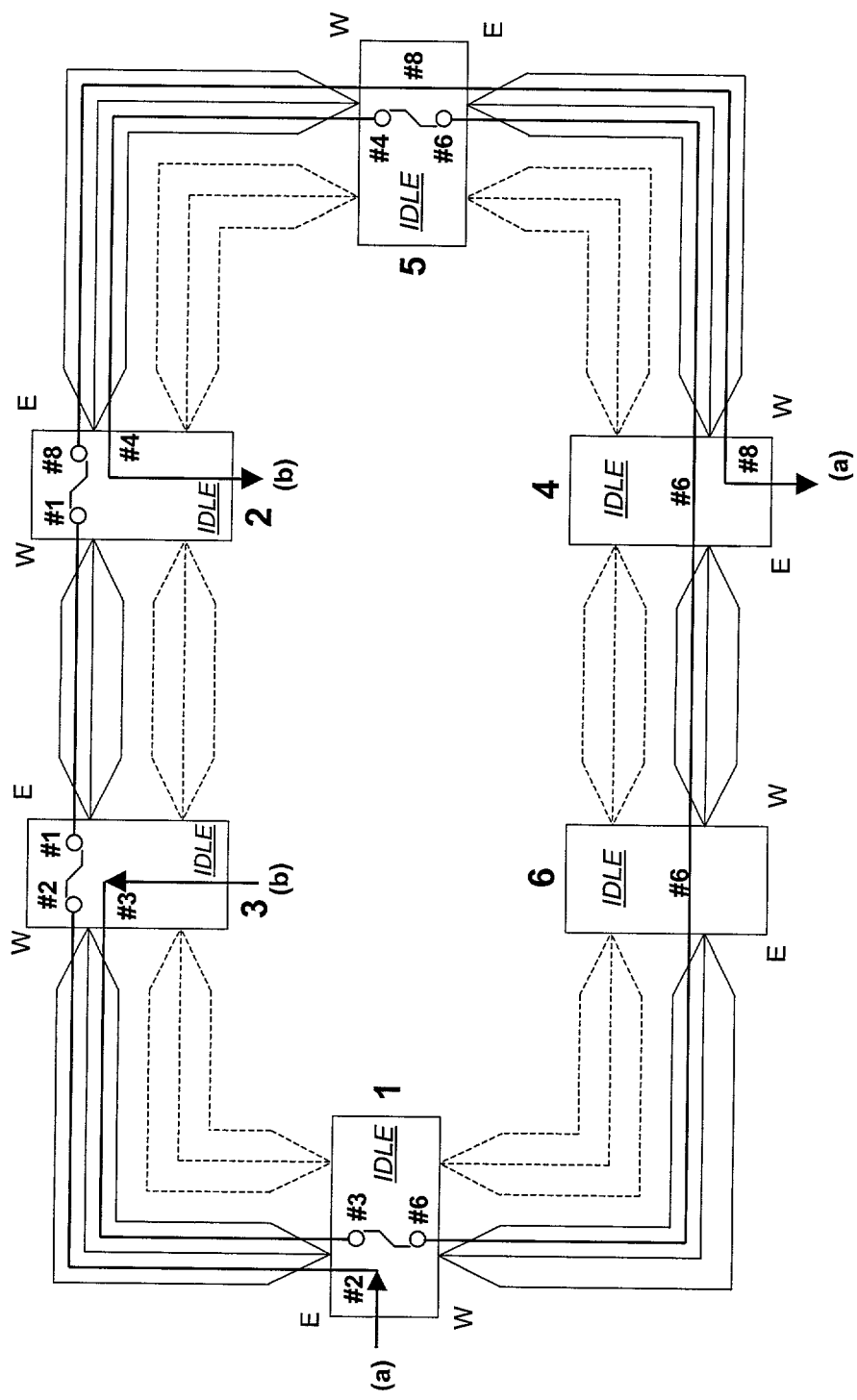
FIG. 10 shows a two/four-fiber ring network with a plurality of nodes, two data flows installed on different wavelengths along with the ring in a stable situation free of failures.
Figure 11:
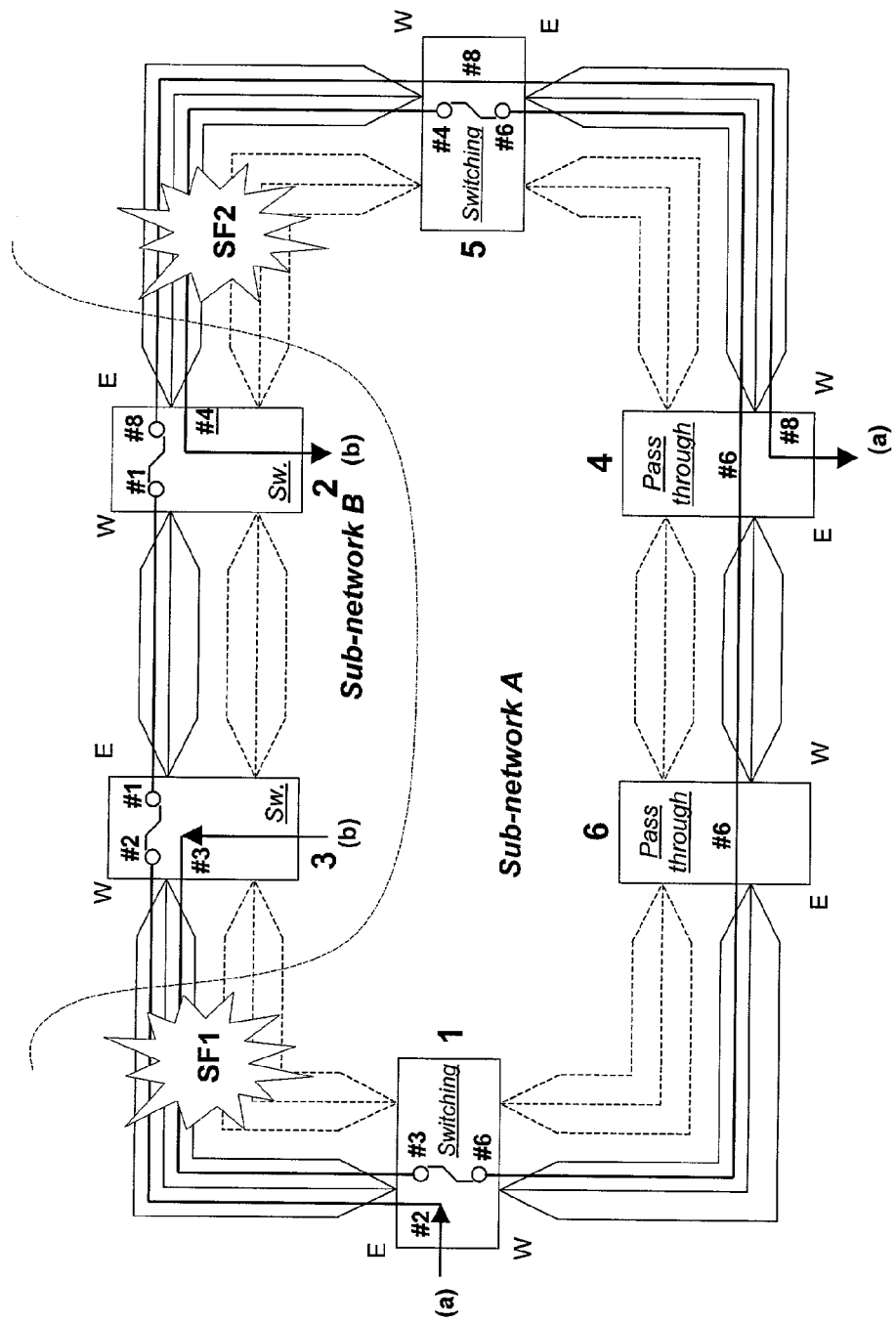
FIG. 11 shows the network of FIG. 10 in case of double failure with consequent isolation of two nodes and the definition of two sub-networks.
Figure 12:
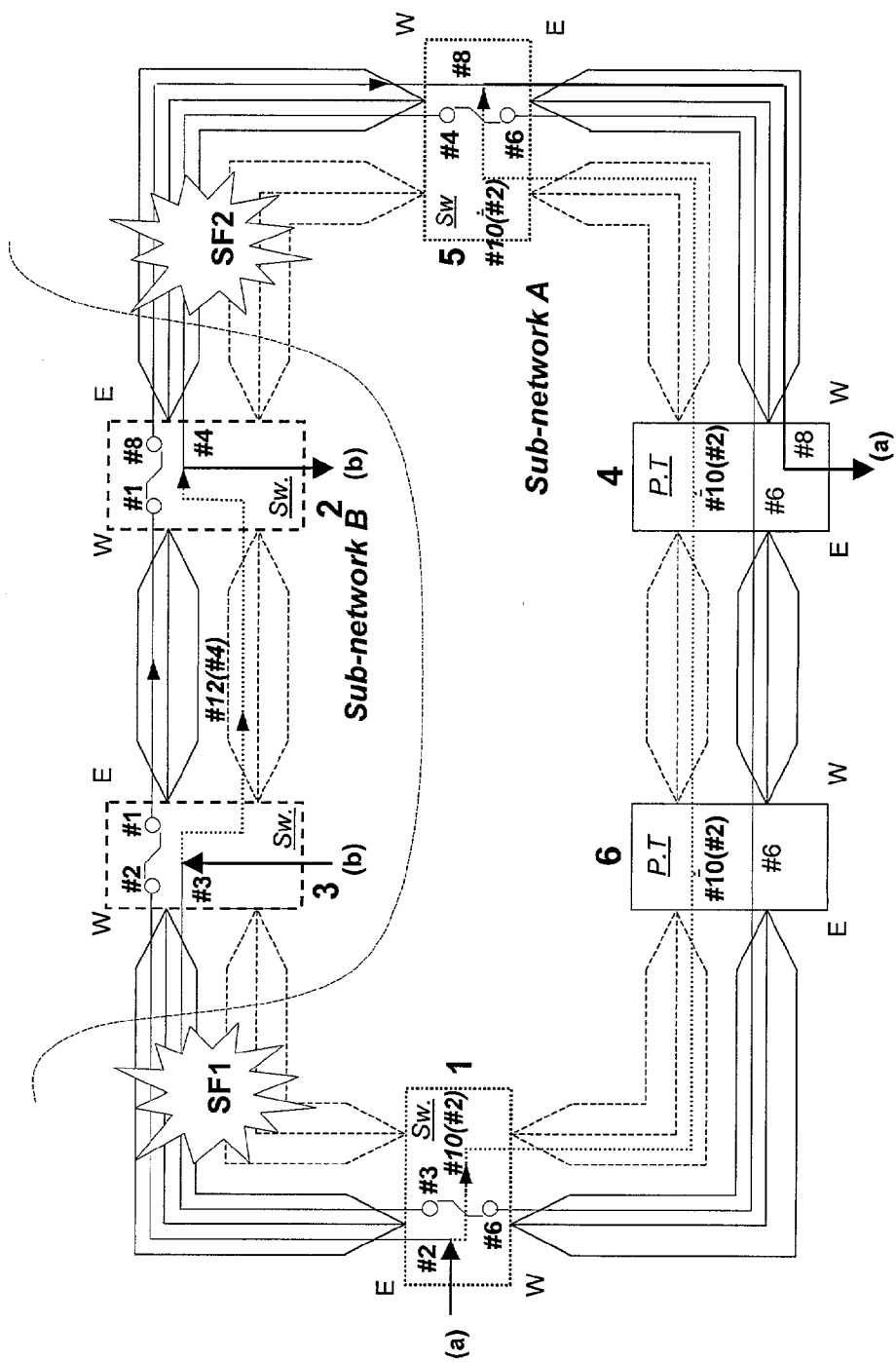
FIG. 12 shows a possible criterion by which it is possible to protect the data flow of FIG. 11.

Let's now assume a situation with more than two isolated nodes (due to two or more failures). Reference is to be made to FIGS. 10–12, wherein—substantially—the same representation of FIGS. 7–9 is utilized. There are two data flows (data flow (a) and data flow (b)) installed in the ring and there is WLI in the nodes 3 and 2 (on the data flow (a)) and in the nodes 1 and 5 (on the data flow (b)). In order to make the description more generic, the numbering of the nodes is not in the usual ascending order. In the free-of-failure condition, all the nodes are in the idle status.

The occurrence of two failures (SF1 and SF2) in spans which are not adjacent to the same node results in the isolation of two nodes (3 and 2). The resulting sub-networks which are in this way defined are the Sub-network A, comprising the nodes 1, 4, 5 and 6, and the Sub-network B, comprising the nodes 2 and 3.

The next step consists in identifying the position of termination nodes of each data flow and in checking that both the termination nodes of each data flow belong to one or to the other sub-network. In the case of FIG. 11, both the termination nodes (1, 4) of the data flow (a) belong to the the sub-network A and both the termination nodes (2, 3) of the data flow (b) belong the to the sub-network B: both the data flows can be saved notwithstanding the two failures and the WLI in the nodes.

As far as the choice of the span involved to identify the $\lambda_{PR}$ to be utilized for the re-routing is concerned, it is assumed to utilize by way of a mere non limiting and exemplifying example the above said criterion i).

For the data flow (a), sub-network A, the switching nodes are the nodes 1 and 5. The switching node with the lower ID is NE1. Therefore the span affected by a failure adjacent to the switching node with a lower ID is the span 1–3. In the span 1–3 the data flow (a) was originally allocated on the $\lambda_{WK}$#2. Therefore, in the case of two-fiber ring with n=16, the data flow (a) shall be re-routed by utilizing the $\lambda_{WK}$#10 while in the case of a four-fiber ring, the data flow (a) will be re-routed by utilizing the $\lambda_{PR}$#2, similarly to the criteria mentioned for the single failure.

For the data flow (b), sub-network B, the switching nodes are the nodes 2 and 3. The switching node with a lower identification is NE2. The span affected by a failure which is adjacent to the switching node with a lower ID is therefore the span 2-5. In the span 2–5 the data flow (b) was originally allocated on $\lambda_{WK}\#14$ $\lambda_{WK}\#4$. Therefore, in the case of a two-fiber ring with n=16, the data flow (a) will be re-routed by utilizing the $\lambda_{PR}\#12$ while in the case of a four-fiber ring, the data flow (a) will be re-routed by utilizing the $\lambda_{PR}\#4$, similarly to the criteria mentioned for the single failure.

FIG. 13 illustrates a possible representation of the above said table, indicated by the name of "Permutation Table". The order and the arrangement of information contained in such a permutation table can of course vary from those indicated in the given representation. The table comprises 2M lines, wherein M is the number of $\lambda_{WK}$ carried by the generic OMS-n line signal and the duplication refers to both the two possible allocation directions of the single unidirectional data flow in the ring. The first column, identified by "DATA FLOW #" indicates the number of the data flow and the direction (from W to E or from E to W). The next columns are relevant to each node of the ring ($1^{st}$ NODE-$16^{th}$ NODE) to which the respective node identification (Node ID) is associated. It is to point out that the number of nodes to be managed by the protection mechanism is connected only with the bits (bytes) number assigned in the field of the signaling protocol on the base of the protection mechanism itself, for the communication of the identification code of node: the example mentioned concerns 16 nodes, since it is assumed that 4 bits of a 8-bit byte are dedicated for the signaling of the identification of the "Source Node" and of the "Destination Node". For each node information are supplied; such information being related to the fact that a certain data flow, in that node, is Dropped (D), Inserted (I) or allowed to transit (PT), and being relevant to the λ where the data flow is allocated (column λ, figures from 1 to M) and relevant to possible wavelength concatenations (column CI). These information are supplied for each node distinguishing between East and West sides.

Each node involved in the allocation of the data flow in WLI, if called to act as a "switching" node, having the possibility of look up such a table, is in a position of considering the identification of span affected by a failure, of defining some sub-networks, of identifying the data flow that could be recovered, of choising the reference span, of identifying the reference $\lambda_{WK}$ and of choising the corresponding $\lambda_{PR}$ for the re-routing.

In the Figures from 14 to 22 a four-fiber ring has been always represented in a schematic manner, wherein the ring switch far end process is managed. In such a topology it is assumed that two fibers are dedicated to the transport in both the transmission directions of the working wavelengths and the remaining two fibers are dedicated to the transport of the corresponding protecting wavelegnths.

The considerations made are to be generically understood as applicable to OMS-SPRING rings independently from the line capacity in terms of wavelength number, carried by the ring itself. As previously affirmed, in principle the method described in the present description is applicable to topologies which consider also a number of physical carriers (fibers) utilized for the connection of the various nodes of the ring network which is different from "two" or "four": in particular there is no restrictions of applying the described method to single-fibre rings, wherein different (working and protecting) wavelengths are allocated in a bidirectional way. Furthermore, the examples mentioned do not consider the possible presence of extra-traffic configurable in the low priority channels and present when the ring is not requiring any protection process (such a condition being defined as "Idle" status), as this has no influence on the capacity of configurating and protecting the traffic in WLI: in fact, any "ring switch" results in the preventive removal of the whole extra-traffic in the respective transmission nodes and the subsequent use of all the low priority channels for the protection operations of the traffic configured in the high priority channels.

Figure 14:
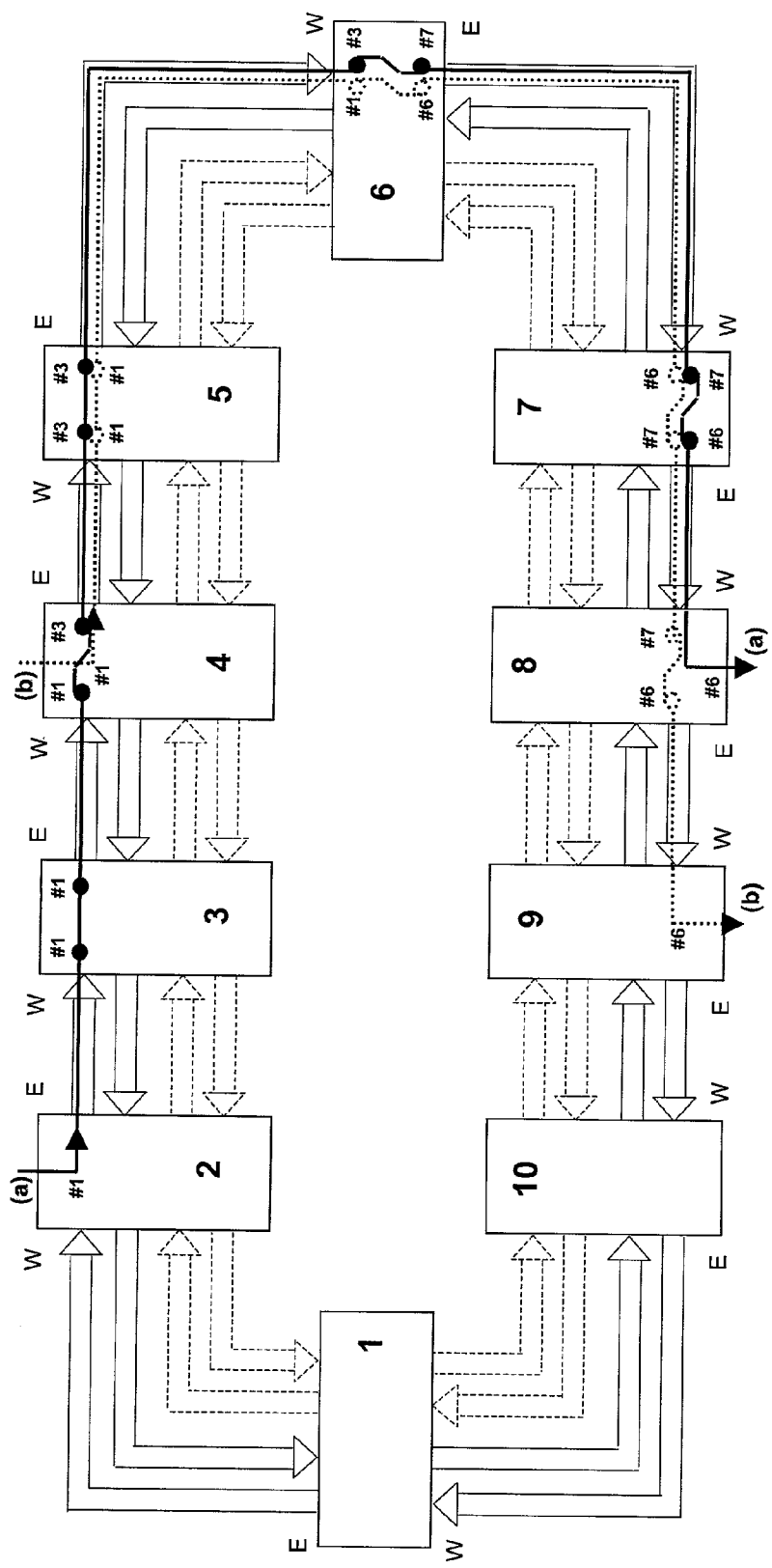
FIG. 14 shows a ring network with a plurality of nodes, two data flows installed and some allocation changes in a stable situation free of failures.
Figure 15:
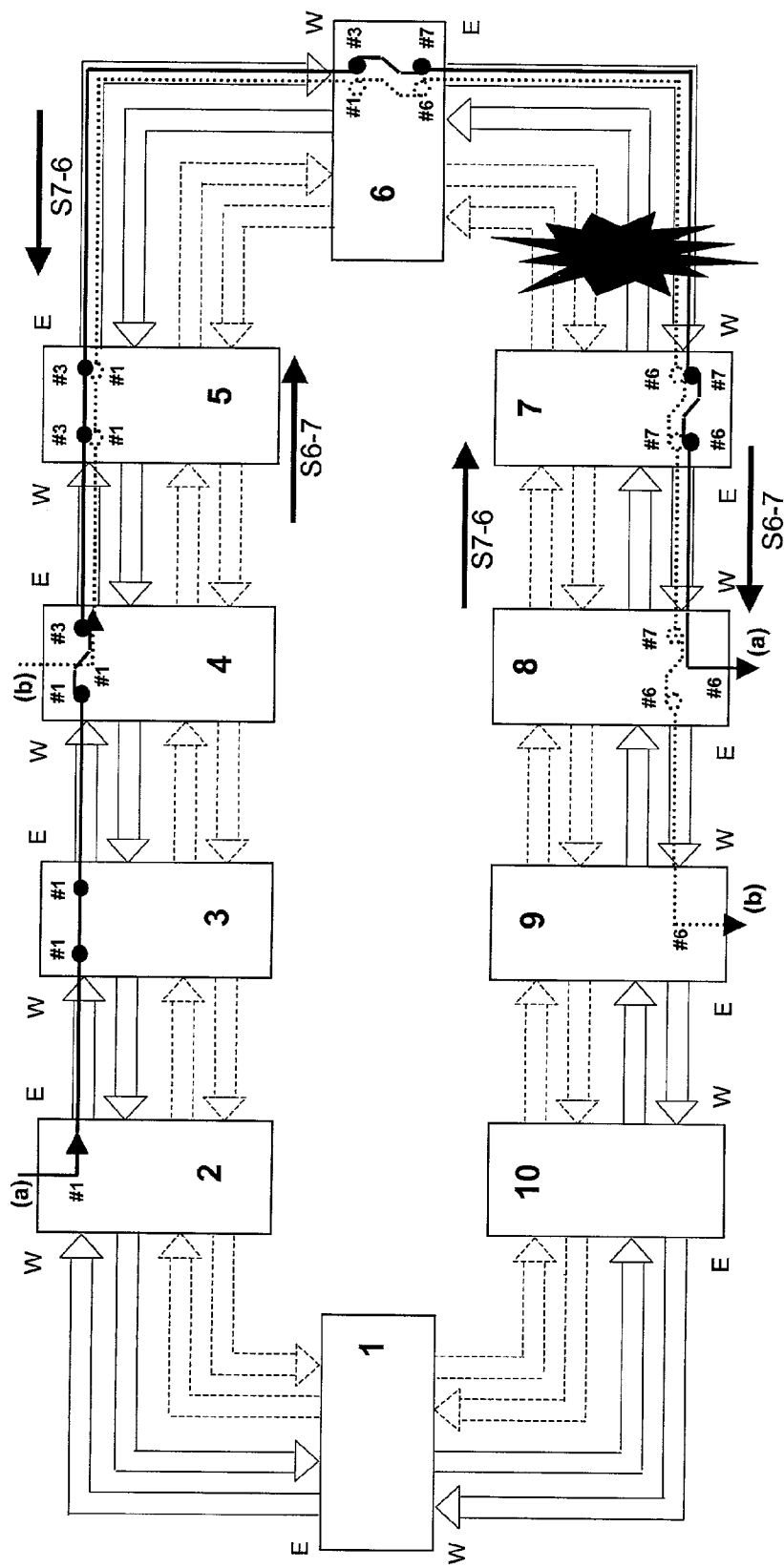
FIG. 15 shows the same ring network as per FIG. 14 immediately after a ring type failure.
Figure 16:
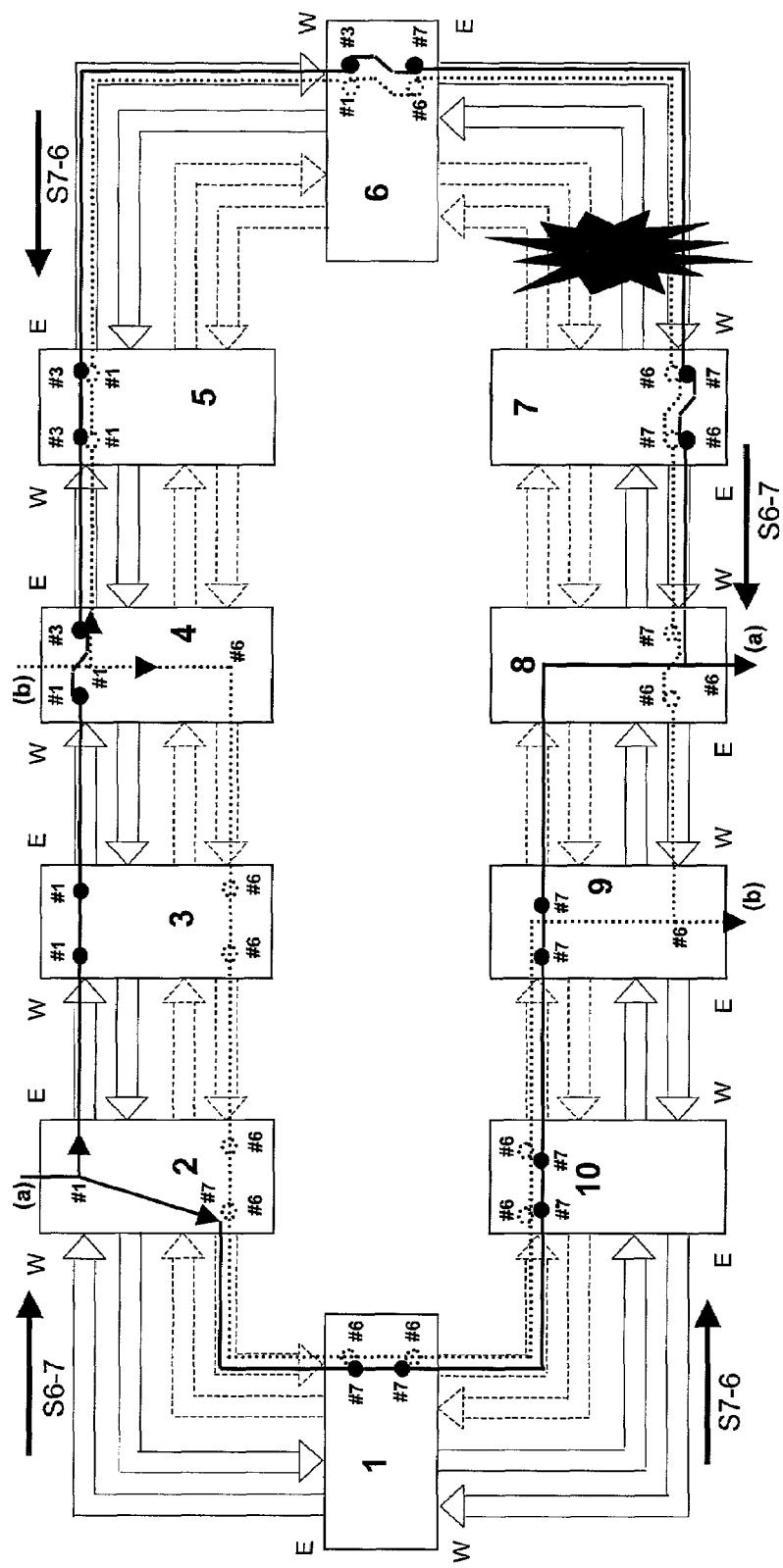
FIG. 16 shows the ring network as per FIG. 15 in a stable situation with a ring type failure.

In the various FIGS. 14–16 a four-fiber ring has been always represented. The two working fibers (which carry the working wavelengths) have been indicated by arrows bordered by a plain line, while the protecting fibers (which carry the protecting wavelengths) have been indicated by arrows bordered by a broken line.

The ring network illustrated with the aim to describe the invention comprises ten network elements (NE) or nodes, indicated by rectangles and numbered by the respective numbers (from 1 to 10).

Two data flows, "flow (a)" and "flow (b)", are represented in the ring by way of a mere non limiting and exemplifying example. The first flow (flow a) has been represented by a continuous bold line while the second flow (flow b) has been represented by a bold dotted line. The flow (a) is inserted at the NE8. The flow (b) is inserted at the NE4 and is extracted at the NE9.

FIG. 14 shows a failure protected ring in an OMS-SPRING configuration where the Wavelength Interchange (WLI) occurs. Two are the data flows installed:(a) and (b). The flow (a) enters the ring at NE2 and is allocated on the λ#1; therefore, in the span 2–3 the allocation is λ#1; in NE3 the allocation is not changed; in NE4, the allocation is changed from λ#1 to λ#3; therefore, in the span 4–5 the allocation is λ#3; in NE5, the allocation is not changed; in span 5–6 the allocation is therefore λ#3; in the NE6, the allocation is changed from λ#3 to λ#7; in the span 6–7 the allocation is therefore λ#7; in the NE7 the allocation changes again from λ#7 to λ#6; therefore, in the span 7–8 the allocation is λ#6; the flow (a) is extracted at the NE8. As far as data flow (b) is concerned: it enters the ring at NE4 and is allocated on the λ#1; this allocation is mantained up to NE6 wherein it passes from λ#1 to λ#6; at the NE7 it is changed again (passing from λ#6 to λ#7) and at the NE8 (passing from λ#7 to λ#6). Finally, the flow (b) is extracted at NE9.

In case of ring type failure (namely a failure which makes unutilizable both the working wavelengths and the protecting wavelengths), the present invention provides a method for overcoming this failure notwithstanding the presence of wavelength allocation changes in the ring. It is necessary to refer, for the single ring failure, to the FIG. 15 and 16 wherein a ring failure in the span 6–7 has been simulated.

In case of failure, the nodes which are adjacent to the failure (6 and 7) will transmit appropriate signals of failure in the opposite direction to the failure itself. In the specific case, the NE6 will transmit to NE7 a signal for indicating the occurrence of a ring failure in the span 6–7 and that no action has been now undertaken. This signaling should contain, at least, the following information: Cause of the Request (for instance Signal Failure), Destination Node (namely NE7), Source Node (namely NE6), Communication Direction ("long" path of the ring), Status of Protection (that is "no action status").

NE7 operates in a similar way by issuing a congruent signaling towards the NE6 from its East (E) side: Cause of the Request (Signal Failure), Destination Node (that is the node "6"), Source Node (that is the node "7"), Communication Direction ("long" path of ring), Status of Protection ("no action status").

These signals travel the ring in opposite directions and will be received by the nodes (2, 8; 4, 9) terminating the flows (a) and (b) which implement the requested Bridge & Switch (BR&SW) by utilizing the $\lambda_{PR}$ According to the present invention, the ring protection (BR&SW and Pass-Through), in the case of a single ring type failure, is implemented by removing the terminations of the extra-traffic allocated on the $\lambda_{PR}$ relating to the span affected by an event and by allocating the normal traffic on such $\lambda$. With reference to FIG. 16, since in the span 6–7 the flow (a) was allocated on the $\lambda_{WK}$#7 and the flow (b) was allocated on the $\lambda_{WK}$#6, for the first flow, the allocation $\lambda_{PR}$#7 will be used and for the second flow the allocation $\lambda_{PR}$#6.

If WLI is configurated also on low priority traffic, the high priority traffic protection which requires the use of at least one of the protecting wavelengths utilized in the WLI at low priority, should bring nevertheless the action of removing of both the terminations of the low priority traffic.

Once that a node adjacent to the event has received the signaling transmitted by its homologous opposite side, with a "no action" value, as far as the status of protection is concerned, the node itself will send a modified signaling wherein the Status of Protection="bridge and switch status". After the restoration of the full functionality of the ring (failure elimination), the BR&SW will be removed and the failure signalings eliminated.

The present invention, in addition to the case of the above illustrated single event, provides for a traffic protection method applicable to multiple failures resulting in the isolation of one or more nodes, wherein the WLI of the installed flow is configurated. In this context three event scenarios are separately considered and described: in the first scenario the events occur in the same time, in the second scenario the events occur almost in the same time, while in the third scenario the events occur in different times.

Initially, with reference to the FIG. 17, it is considered the case wherein two events (SF1 and SF2) occur exactly in the same instant. For simplicity reasons, the data flows (a) and (b) before the occurrence of the events are allocated as what was described for the FIG. 14 and therefore the description of allocations will be not repeted. After the occurrence of the first event (SF1) in the span 6–7, the NE6 (FIG. 17.1) will send from the West side a failure signal with Status of Protection "no action status", while, after the second event (SF2) in the span 7–8, the NE8 will send from the East side an equivalent (namely containing "no action status") signaling of contemporary event (FIG. 17.2).

When each of both the signalings with "no action" code generated by the "switching" nodes is received by the nodes terminating the flows to be protected, there is the removal of the local termination (if present) of the Extra Traffic allocated on the protecting wavelength corresponding to the working wavelength of the failed span to which the signaling is referred, while in the nodes called to implement the pass-through of the $\lambda_{PR}$ to be used for the protection, there is the removal of the local termination (if present) of the Extra Traffic allocated on such wavelengths and the subsequent connection of such wavelengths under pass-through. The just now described actions (removal of Extra Traffic and removal of Extra Traffic+Pass-Through) are removed both by the flow termination nodes and by the pass-through nodes when these nodes receive the second signaling generated by the "switching" nodes.

When (FIG. 17.3) the signaling containing the "no action" code of SF1 reaches the NE8, the NE8 (FIG. 17.4) will send towards the NE7, a signaling containing a code of "bridge and switch status". Similarly, it occurs for the NE6 (FIG. 17.5): when it receives the signaling containing the "no action" code of SF2, it will send a signaling containing the code of "bridge and switch status" towards the NE7.

When one of the two signalings with BR&SW code generated by the switching nodes is received by the termination nodes of the Normal Traffic to be protected, there is the removal of the local termination (if present) of the Extra Traffic allocated on the $\lambda_{PR}$ to be utilized for the protection, chosen according to one of the previously described criteria, while in the nodes called to implement the pass-through of the "protecting" wavelengths to be utilized for the protection, there is the removal of the local termination (if present) of the Extra Traffic allocated on these wavelengths and the subsequent pass-through connection of such $\lambda_{PR}$.

The BR&SW action on the $\lambda_{PR}$ chosen with the same above criterion is implemented by each termination node of the Normal Traffic flow to be protected when both the signals with "bridge and switch" code are detected at both sides of the node itself.

Thus, a stable status of the protected ring has been reached.

First, with reference to the various FIG. 18, it has been considered the fact wherein two events (SF1 and SF2) occur almost at the same instant (or, in any case, the event SF2 occurs before the stabilization of the situation caused by SF1). For simplicity reasons, the flows (a) and (b) before the occurrence of the events are allocated as what was described for FIG. 14 and therefore the description of allocations will not repeated. Due to the occurrence of the first event (SF1) in the span 6–7, the NE6 will issue from the West side an event signaling with a "no action" code and, similarly, it will issue another event signal (with a "no action" code) from the East side. See FIGS. 18.1 and 18.2.

It is necessary to assume (FIG. 18.3) that the event signaling generated by the East side of NE6 reaches the NE8 before the occurrence of the second event (SF2) in the span 7–8, with the NE7 becoming isolated. In view of the second event (SF2), the NE8 (node adjacent to the failure) will send a corresponding event signal towards the NE7 (with "no actions status" code) from its East side. In any case, the signaling of the second event will follow up the one of the first event (FIG. 18.4).

When the signalings containing the "no action" code of the first event reach the NE2 (FIG. 18.5) terminating the flow (a), this node will implement the BR&SW action by utilizing the $\lambda_{PR}$ corresponding to the $\lambda_{WK}$ of the span affected by the first event (in the specific case, $\lambda_{PR}$#7) Nevertheless, when the new signaling (generated by the NE8 towards the NE7) relevant to the second event (SF2) reachs the NE2, the just implemented BR&SW action is removed (FIG. 18.6).

Similarly (FIG. 18.7), when the signalings containing the "no action" code of the first event reach the NE4, the termination node of flow (b), this node will implement the BR&SW action by utilizing the $\lambda_{PR}$ corresponding to the $\lambda_{WK}$ of the span affected by the first event (in the specific case, $\lambda_{PR}$#6). Nevertheless, when also the new signaling (generated by the NE8 towards the NE7 with "no action" code) relevant to the second failure (SF2) reachs the NE4, the BR&SW action, just implemented, is removed (FIG. 18.8).

Obviously, the actions preceding the temporary BR&SW just described are the removal of the local termination (whether present) of the Extra Traffic allocated on the $\lambda_{PR}$ associated to the span 6–7 both on the termination nodes of the flow to be protected and on the nodes called to implement the pass-through of the wavelengths as well as the pass-through connection of the $\lambda_{PR}$ themselves: for the implementation of such actions it is sufficient, at the node involved, the reception of at least one of the two signalings with "no action" code generated by the switching nodes.

In the same time, when the signaling containing the "no action" code of the first failure reaches the NE8, the NE8 will issue a signaling containing the code of "bridge and switch status" (FIG. 18.9). The same will occur for the NE6: upon receipt the signaling containing the "no action" code of the first event, it will send a signaling containing the code of "bridge and switch status" (FIG. 18.10).

Owing to the presence of the new signaling (generated by NE8 towards the NE7 with "no action status" code) relevant to the second event (SF2), the NE6 will change again its signaling passing from code of "bridge and switch status" to the code of "no action status" (FIG. 18.11).

In this phase there are in the ring both the signaling transmitted by the NE8 containing the code of "bridge and switch status" and the two consecutive signalings transmitted by the NE6 containing respectively the "bridge and switch" code and the "no action" code. The signalings containing the code of "bridge and switch status" produce in the nodes detecting them, the removal of the local termination (whether present) of the Extra Traffic allocated on the $\lambda_{PR}$ chosen for the protection according to one of the previously described criteria (for instance the $\lambda_{PR}$ relating to the allocation of the flow of the Normal Traffic used in the span affected by the first event, $\lambda$#6) as well as the pass-through of such $\lambda_{PR}$ in the nodes called to develop such a function. It is to be observed that among the two signalings that are consecutively emitted by the NE6, the one containing the "no action" code does not remove the removal actions of Extra Traffic and pass-through activated by the preceding signaling (with "bridge and switch" code), as both refer to the same failed span.

The NE9 (FIG. 18.12), upon receiving from both its W and E sides a signaling with the "bridge and switch" code relating to the two detected events, will implement the BR&SW action by utilizing the allocation of the "protecting" wavelength relating to one of the spans that are affected by the event, for example the span affected by the first event ($\lambda_{PR}$#6). The NE8, which receives the signaling containing the BR&SW code previously sent by the NE6, will implement the BR&SW action (FIG. 18.13) by utilizing the protecting wavelength relating to one of the spans affected by failure, for example the span affected by the first event ($\lambda_{PR}$#7) (The choice criteria have been previously described).

Since the request, that reaches both the NE9 and the NE8 with a "no action" code is relevant to the span affected by the event already indicated in the previous request (namely the one between the nodes 6 and 7), the BR&SW action is kept (FIG. 18.14).

When the request relating to the second event (SF2) and containing the BR&SW code reaches the NE6, also the signaling transmitted by this node is updated with the BR&SW code (FIG. 18.15).

The NE4, upon receiving signalings with a BR&SW code from both the sides, will implement the BR&SW action by utilizing the $\lambda_{PR}$ relating to one of the spans affected by event, for example the span affected by the first event ($\lambda_{PR}$#6).

Finally, the NE2, upon receiving from both its W and E sides a signaling with a BR&SW code (generated by nodes 6 and 8), will implement the BR&SW action (FIG. 18.16) by utilizing the allocation of protecting wavelength relevant to one of the span affected by event, for example the span affected by the first event ($\lambda_{PR}$#7).

In such a way, a stable status in the protected ring is implemented.

As above said, the scenario of the actions undertaken by the various nodes is different in the case wherein the events do not occur at the same time. For this purpose, two different sub-schenarios are distinguished. With reference to FIGS. 14–16 and 19, the actions and the consequences relevant to the first sub-scenario shall be listed schematically hereunder starting from a situation free of events.

The first event (SF1) has occurred. The NE6 sends a failure signal towards the NE7 from the W side, containing the "no action" code. The NE7 sends from the E side an equivalent signal towards the NE6 (FIG. 15).

Both the so generated signalings reach the termination nodes of the flows (a) and (b). The termination nodes implement the BR&SW action for each flow to be protected by utilizing the corresponding protecting wavelengths of the span affected by SF1. The flow (a) is allocated on the $\lambda_{PR}$#7. The flow (b) is allocated on the $\lambda_{PR}$#6 (FIG. 3).

The nodes 6 and 7 adjacent to the event/failure SF1 send, each to each other, the respective signalings with a "bridge and switch" code and there is a stable scenario of ring protected against SF1 (FIG. 3).

SF2 occurs in the span 7–8: the NE7 is isolated (FIG. 19.1). The NE8 issues from the E side an appropriate signaling towards the NE7 with a "no action" code (FIG. 19.2).

The "ring switch" action implemented for the flow (a) (both the real BR&SW and the pass-through at the intermediate nodes) is removed (FIGS. 19.3 and 19.4). The "ring switch" action implemented for the flow (b) (both the real BR&SW and the pass-through at the intermediate nodes) is removed (FIGS. 19.5 and 19.6).

The NE6 receives the signaling generated by the NE8 for the NE7 and issues an equivalent signaling for the NE7 (FIG. 19.7).

The NE8 receives the signaling just generated by the NE6 and updates its own transmission by reporting the code of BR&SW status (FIG. 19.8).

The NE6 receives the signaling generated by the NE8 with "bridge and switch" code and on its turn updates its own signaling with the BR&SW code (FIG. 19.9).

The nodes 2 and 8 receive the signalings generated by the nodes 8 and 6 towards the NE7 (isolated) containing the "bridge and switch" code and implement the BR&SW action by utilizing, for example, the $\lambda_{PR}$ corresponding to the one of the first failed span ($\lambda_{PR}$#7). The scenario becomes stable for the flow (a) (FIGS. 19.10, 19.11).

The nodes 4 and 9 receive the signalings generated by the nodes 8 and 6 towards the NE7 (isolated) containing the "bridge and switch" code and implement the BR&SW action by utilizing for example the $\lambda_{PR}$ corresponding to the one of the first failed span ($\lambda_{PR}$#6). The scenario becomes stable for the flow (b) (FIGS. 19.12, 19.13).

The removal actions of the local termination (if present) of the Extra Traffic allocated on the $\lambda_{PR}$ chosen for the protection according to one of the already described criteria and the subsequent pass-through of the same protecting wavelength in the intermediate nodes precede the BR&SW actions just described and are implemented through the rules already put into evidence for the two preceding scenarios.

With reference to the FIGS. 14–16 and 20, the actions and relevant consequences regarding the second sub-scenario of double failure in different times, always starting from a situation free of failures, will be listed hereunder.

The first failure occurs (SF1). The NE6 sends a signaling with "no action" code from the W side towards the NE7. The NE7 sends an equivalent signaling from the E side towards the NE6 (FIG. 14).

Both the signalings reach the termination nodes of flows (a) and (b). The termination nodes implement the BR&SW action for each flow to be protected by utilizing the corresponding $\lambda_{PR}$ of the span affected by SF1. The flow (a) is allocated on the $\lambda_{PR}$#7. The flow (b) is allocated on the $\lambda_{PR}$#6 (FIG. 15).

The nodes 6 and 7 adjacent to the failure SF1 receive the signalings with "no action" code and send, one to each other, the respective signalings with a "bridge and switch" code and so there is a stable scenario of ring protected against SF1 (FIG. 16).

SF2 occurs in the span 7–8: the NE7 becomes isolated (FIG. 20.1). The NE8 sends from the E side towards the NE7 an appropriate signaling with a "no action" code (FIG. 20.2).

The NE8, in its capacity of node adjacent to the failure and termination node, evaluates if the already protected flows can be protected. In a positive case no action is undertaken, in a negative case the BR&SW action is removed (FIG. 20.3).

The NE9 receives the request generated by the NE8 for the NE7 and evaluates if the already protected flows can be still protected. In the affirmative, no action is undertaken; in the negative, the BR&SW action is removed (FIG. 20.4).

The NE2 receives the request generated by the NE8 for the NE7 and evaluates if the already protected flows can be still protected. In the affirmative case, no action is undertaken; in the negative case, the BR&SW action is removed (FIG. 20.5).

The NE4 receives the request generated by the NE8 for the NE7 and evaluates if the already protected flows can be still protected. In the affirmative, no action is undertaken; in the negative, the BR&SW action is removed (FIG. 20.6).

When the NE6 receives the signaling generated by the NE8 for the NE7, it updates its request (towards the NE7) by inserting a code equal to "no action".

After a further interchange of signalings, the nodes adjacent to the failure update the respective signalings by inserting the selector status code equal to "bridge and switch".

Now, only signalings with BR&SW code travel down the ring subjected to SF1 and SF2 and then a stable scenario is reached for the flows (a) and (b) vis-à-vis the failures SF1 and SF2.

It will be realized that the first sub-scenario involves a relatively simple implementation, since it is not necessary to store the "history" of the events, but in the same time the traffic is not saved in an optimal manner as the BR&SW action is always removed. On the contrary, the second sub-scenario saves the traffic in a better way, but it is more difficult to implement, as the "history" of traffic has to be stored.

Having analized in detail the situations of a single and double event (contemporary, almost contemporary or in different times), there is now the schematic description of the actions that each network node has to undertake (and the respective consequences), when the failures are removed and the functionalities in the ring are restored.

Let's start from a stable situation of two failures SF1, SF2: in this situation, the NE7 is isolated (FIG. 21.1) and only signalings with a "bridge and switch" code associated to two detected failures are travelling in the ring. Assume to remove SF1 first: the NE7, no more isolated, begins to send towards the NE8 the signaling with a "no action" code relating to the span affected by a failure (SF2) still present between the nodes 8 and 7 (FIG. 21.2).

Since the "protecting" wavelength of the span 7–6 was chosen for the re-routing of the Normal Traffic, the BR&SW action (and removal of the possible local terminations of Extra Traffic allocated on the $\lambda_{PR}$ utilized) in the NE4 has to be removed. Similarly, when the signaling generated by the NE7 reaches the other flow termination nodes (2, 9, 8), the BR&SW action and the possible "removal of the local "Extra Traffic" are removed also in these nodes 2, 9, 8 (FIGS. 21.3–21.5). The removal of "BR&SW" in the termination nodes is accompanied by the removal of the pass-through (and of the possible removal of the local Extra Traffic) by the intermediate nodes which have implemented the pass-through of the "protecting" wavelength which was so far utilized for the protection. As the signalings present in the intermediate nodes refer to the same span affected by a failure, these nodes can implement, where requested, the pass-through of the $\lambda_{PR}$, relating to the current failure, to be utilized for the protection of the flows.

The NE8, in its capacity of node adjacent to the failure SF2, receives the signaling generated by the NE7 with a "no action" code and changes the code of its signaling for the NE7 from BR&SW code to "no action" code (FIG. 21.6). Such signaling with "no action" code reaches all the termination nodes (9, 2, 4) and in such a way indicates to them that a single failure (SF2) is present. On their turn, the termination nodes shall implement the BR&SW action (FIGS. 21.8–21.10) by utilizing the $\lambda_{PR}$ which correspond to the span affected by a failure/event (for the flow (a), the $\lambda_{PR}$#6 will be used, for the flow (b), the $\lambda_{PR}$#7 will be used).

The nodes (7, 8) adjacent to the still present event (SF2) will send, one towards the other, corresponding signalings with a "bridge and switch" code and a stable condition of single event will be reached (FIGS. 21.11–21.12).

When also SF2 is removed, the ring will reach the stable condition without events/failures (FIGS. 21.13, 21.14), with the progressive removal of the "Bridge" and "Switch" actions at all the termination nodes of flows to be protected and the subsequent signalings with a code indicating the absence of interchange requests by all the ring nodes comprising the nodes (7, 8) adjacent to the just removed failure (SF2).

Let's start now from a stable situation of two failures SF1, SF2 (FIG. 22.1): in this situation the NE7 is isolated and only the signalings with a "bridge and switch" code associated to the two detected failures are travelling in the ring. Assume to remove SF2 first: the NE7 (FIG. 22.2) is no more isolated and begins to send towards the NE6 the signaling with a "no action" code relating to the span affected by event (SF1) still present between the nodes 6 and 7.

Since the choice of the $\lambda_{PR}$ of span 7–6, for the protection action of the Normal Traffic, the BR&SW action in the NE8 can be maintained (FIG. 22.3). Similarly, the signaling generated by the NE7 for the NE6, reaches the other flow termination nodes (9, 2, 4), but the BR&SW action is kept also in these nodes 9, 2, 4 (FIGS. 22.4–22.6).

The same elaboration is implemented at the intermediate nodes which implement the pass-through of the $\lambda_{PR}$ utilized for the protection: the pass-through is kept.

At the end, also the NE6 adjacent to the event SF1 receives the signaling generated by the NE7 and will send the corresponding signaling with the selector status code equal to "no action" thus coming to a stable scenario with signalings of "bridge and switch" code in the whole ring.

When also SF1 is removed, the ring shall reach the stable condition without failures, with the progressive removal of the "Bridge" and "Switch" actions by all the flow termination nodes and the subsequent signalings with a code indicating the absence of requests by all the ring nodes, including the nodes (6, 7) adjacent to the just removed event (SF2). See FIGS. 22.7 and 22.8.

In view of the above said detailed description, relating to some cases for single and double event, the man skilled in the art will easily understand the actions that each node has to undertake in the case of failure at other spans and/or in the case where more than two events/failures are occurring. Of course, the present invention is applied to all these cases and its scope of protection is extended to all these cases and is limited only by the following claims.

We claim:

1. A method for managing traffic protection in an Optical Multiplex Section-Shared Protection Ring (OMS-SPRing) network in case of failure to a span of an installed path, said network comprising network elements connected one to each other through fiber spans in a ring configuration, said fiber spans comprising working wavelengths for transporting high priority traffic and protecting wavelengths for transporting low priority traffic, wherein said method comprises the steps of:
   providing the installed path according to a wavelength interchange mechanism allocating different wavelengths between an input fiber and an output fiber of at least one network element of the installed path;
   implementing a ring Span Switch action by an Optical Multiplex Section-Shared Protection mechanism;
   re-routing a data flow of the installed path using the protecting wavelength corresponding to the working wavelength of the failed span,
   wherein a further span is affected by a failure and a ring switch near end protection process is provided, wherein the method comprises the step of selecting one between two spans affected by a failure to define a selected failed span and the step of re-routing the data flow of the wavelength interchanged path using the protecting wavelength corresponding to the working wavelength of the selected failed span.

2. A method according to claim 1 wherein said Optical Multiplex Section-Shared Protection Ring network is a two-fiber network, wherein the step of re-routing the data flow of the wavelength interchanged path using the protecting wavelength comprises the step of re-routing the data flow of the path using the protecting wavelength having an index given by the sum of half overall number of the handled channels (n) and the index of the working wavelength allocated on the failed span or on another span among a plurality of spans affected by a failure, the another span is selected to define a selected failed span.

3. A method according to claim 1 wherein said Optical Multiplex Section-Shared Protection Ring network is a four-fiber network, wherein the step of re-routing the data flow of the wavelength interchanged path using the protecting wavelength comprises the step of re-routing the data flow of the path using the protecting wavelength having an index corresponding to the working wavelength of the channel allocated on the failed span or on another span among a plurality of spans affected by a failure, the another span is selected to define a selected failed span.

4. A method according to claim 1, wherein the step of selecting one of the two failed spans comprises the step of selecting the failed span adjacent to a switching node with higher/lower node ID.

5. A method according to claim 1, wherein the step of selecting one of the two failed spans comprises the step of selecting the failed span adjacent to a switching node that comes first/last in the ring network map.

6. A method according to claim 1, wherein the step of selecting one of the two failed spans comprises the step of selecting the failed span adjacent to a switching node which is placed far East/West in the ring network.

7. A method according to claim 1, wherein it comprises the further steps of subdividing the ring network into two sub-networks, a sub-network comprising at least one node that has become isolated by the failures, the other sub-network comprising the other nodes of the ring network, and checking whether the data flow of the path can be re-routed by evaluating if both the corresponding termination nodes belong to one or to the other sub-network.

8. A method according to claim 1, wherein it comprises the further step of providing each network element involved in an allocation of the wavelength interchanged (WLI) path with information concerning the whole allocation of the path in the ring, the information pertains to a network element where the data in the WLI path is Dropped, Inserted or allowed to transit, and
   specifies a wavelength in which the path involved is allocated and relates to t wavelength concatenations corresponding to the network element, by distinguishing between East and West sides of the network elements.

9. A method for managing traffic protection in an Optical Multiplex Section-Shared Protection Ring (OMS-SPRing) network in case of failure to a span of an installed path, said network comprising network elements connected one to each other through fiber spans in a ring configuration, said fiber spans comprising working wavelengths for transporting high priority traffic and protecting wavelengths for transporting low priority traffic, wherein said method comprises the steps of:
   providing the installed path according to a wavelength interchange mechanism allocating different wavelengths between an input fiber and an output fiber of at least one network element of the installed path;
   implementing a ring Span Switch action by an Optical Multiplex Section-Shared Protection mechanism;
   re-routing a data flow of the installed path using the protecting wavelength corresponding to the working wavelength of the failed span,
   wherein a further span of the path is affected by a failure and a "ring switch far end" protection process is provided, wherein the method comprises the steps of: i) releasing a present re-routing which was implemented for the failed span; ii) selecting a span among a plurality of failed spans to define a selected failed span; iii) re-routing the data flow of the path using the protecting wavelength corresponding to the working wavelength of the selected failed span.

10. A method for managing traffic protection in an Optical Multiplex Section-Shared Protection Ring (OMS-SPRing) network in case of failure to a span of an installed path, said network comprising network elements connected one to each other through fiber spans in a ring configuration, said fiber spans comprising working wavelengths for transporting high priority traffic and protecting wavelengths for transporting low priority traffic, wherein said method comprises the steps of:
   providing the installed path according to a wavelength interchange mechanism allocating different wavelengths between an input fiber and an output fiber of at least one network element of the installed path;

implementing a ring Span Switch action by an Optical Multiplex Section-Shared Protection mechanism;

re-routing a data flow of the installed path using the protecting wavelength corresponding to the working wavelength of the failed span, wherein a further path span becomes affected by a failure and a "ring switch far end" protection process is provided, wherein the method comprises the step of keeping a present re-routing, implemented for the failed span, whether the persistency of the re-routing information is supported by ring network elements.

11. A network element of an Optical Multiplex Section-Shared Protection Ring network, said ring network comprising further network elements connected one to each other in a ring configuration through fiber spans, said fiber spans comprising working wavelengths for transporting high priority traffic and protecting wavelengths for transporting low priority traffic, said network element comprising means for implementing ring switch actions, namely pass-through, bridge or switch actions, upon receiving corresponding signalings and means for generating and sending proper signalings in reply to the corresponding signalings in said ring network, wherein a path is installed, wherein in said ring network an interchange wavelength mechanism is provided and wherein said network element, should a failure occur in a span of the installed path, comprises means for re-routing a data flow of the path using the protecting wavelength corresponding to the working wavelength of the failed span, wherein the interchange wavelength mechanism allocates different wavelengths between an input fiber and an output fiber of at least one network element among the network elements comprised of said ring network, wherein a further span of the path becomes failed, wherein it further comprises: means for selecting one of two failed spans and means for re-routing the data flow of the path on the wavelength of the low priority channels corresponding to the working wavelength of the selected failed span.

12. A network element according to claim 11, wherein said Optical Multiplex Section-Shared Protection Ring network is a two-fiber network, wherein the means for re-routing the data flow of the path on the protecting wavelength comprise means for re-routing the data flow of the path on the wavelength having an index given by the sum of the half overall number of wavelengths and the index of a working wavelength allocated on the failed span or on a span among a plurality of failed spans, the span among the plurality of failed spans is selected to define a selected failed span.

13. A network element according to claim 11, in which said Optical Multiplex Section-Shared Protection Ring network is a four-fiber network, wherein the means for re-routing the data flow of the path on the protecting wavelength comprise means for re-routing the data flow of the path on the protecting wavelength having an index corresponding to a working wavelength allocated on the failed span or on a span among a plurality of failed spans, the span among the plurality of failed spans is selected to define a selected failed span.

14. A network element according to claim 11, wherein it further comprises, should a further span of the path become failed, means for keeping a present re-routing, implemented for the failed span, if the persistency of re-routing information is supported by the ring network elements.

* * * * *